US012574155B2

(12) United States Patent
Duan et al.

(10) Patent No.: US 12,574,155 B2
(45) Date of Patent: Mar. 10, 2026

(54) SIGNAL SENDING METHOD AND APPARATUS

(71) Applicant: HUAWEI TECHNOLOGIES CO., LTD., Shenzhen (CN)

(72) Inventors: Ruiyang Duan, Shenzhen (CN); Xueru Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 18/829,481

(22) Filed: Sep. 10, 2024

(65) Prior Publication Data

US 2024/0430039 A1 Dec. 26, 2024

Related U.S. Application Data

(63) Continuation of application No. PCT/CN2023/079124, filed on Mar. 1, 2023.

(30) Foreign Application Priority Data

Mar. 11, 2022 (CN) .......................... 202210235295.5
May 17, 2022 (CN) .......................... 202210541739.8

(51) Int. Cl.
    *H04W 72/21* (2023.01)
    *H04L 1/1607* (2023.01)
    (Continued)

(52) U.S. Cl.
    CPC ............ *H04L 1/1642* (2013.01); *H04L 25/02* (2013.01); *H04L 27/2613* (2013.01)

(58) Field of Classification Search
    CPC .............. H04J 13/0062; H04J 13/0059; H04J 13/0074; H04J 13/22; H04J 11/00;
    (Continued)

(56) References Cited

U.S. PATENT DOCUMENTS 9,008,066 B2 * 4/2015 Taghavi Nasrabadi ......................
H04L 5/0091
370/341
10,728,865 B1 * 7/2020 Cao ........................ H04L 5/0048
(Continued)

OTHER PUBLICATIONS

Juan M et al: "Sequence Sets in Wireless Communication Systems: A Survey", IEEE Communications Surveys and Tutorials, vol. 19, No. 2 ,total 24 pages,XP011651808,DOI:10.1109/COMST.2016. 2639739.

*Primary Examiner* — Eva Y Puente

(57) ABSTRACT

A signal sending method and a communication apparatus are disclosed. The signal sending method includes: A first communication apparatus determines N sequence sending modes, and sends a first signal based on a first sequence sending mode. The N sequence sending modes include the first sequence sending mode. The sequence sending modes indicate sending orders of N sequences, the N sequences are sent by the first communication apparatus in N periods, and N is a positive integer greater than 1. A cyclic shift value between sending orders indicated by any two adjacent sequence sending modes is 1. The first sequence sending mode is determined based on K second sequence sending modes and the N sequence sending modes, the K second sequence sending modes correspond to a second communication apparatus, and K is a positive integer.

20 Claims, 12 Drawing Sheets

(51) Int. Cl.
_H04L 25/02_ (2006.01)
_H04L 27/26_ (2006.01)

(58) Field of Classification Search
CPC .. H04J 13/0003; H04J 13/0055; H04J 11/005;
H04L 5/0048; H04L 5/0053; H04L
5/0007; H04L 27/2613; H04L 5/0055;
H04L 5/001; H04L 5/0051; H04L 5/0057;
H04W 72/21; H04W 72/23; H04W
72/0446; H04W 74/0833; H04W 72/0453;
H04W 72/20; H04W 88/02; H04W 88/08
See application file for complete search history.

(56) References Cited

U.S. PATENT DOCUMENTS

| | | | |
|---|---|---|---|
| 11,677,540 B1 * | 6/2023 | Zhang | H04J 3/0638 |
| | | | 398/154 |
| 2009/0285339 A1 * | 11/2009 | Zhang | H04J 13/10 |
| | | | 375/343 |
| 2013/0176166 A1 | 7/2013 | Kishigami et al. | |
| 2018/0095163 A1 | 4/2018 | Lovberg et al. | |
| 2019/0132061 A1 | 5/2019 | Xin et al. | |
| 2019/0141675 A1 * | 5/2019 | Blasco Serrano | H04W 72/02 |
| 2021/0203471 A1 * | 7/2021 | Lee | H04L 5/1461 |

* cited by examiner

N periodicities

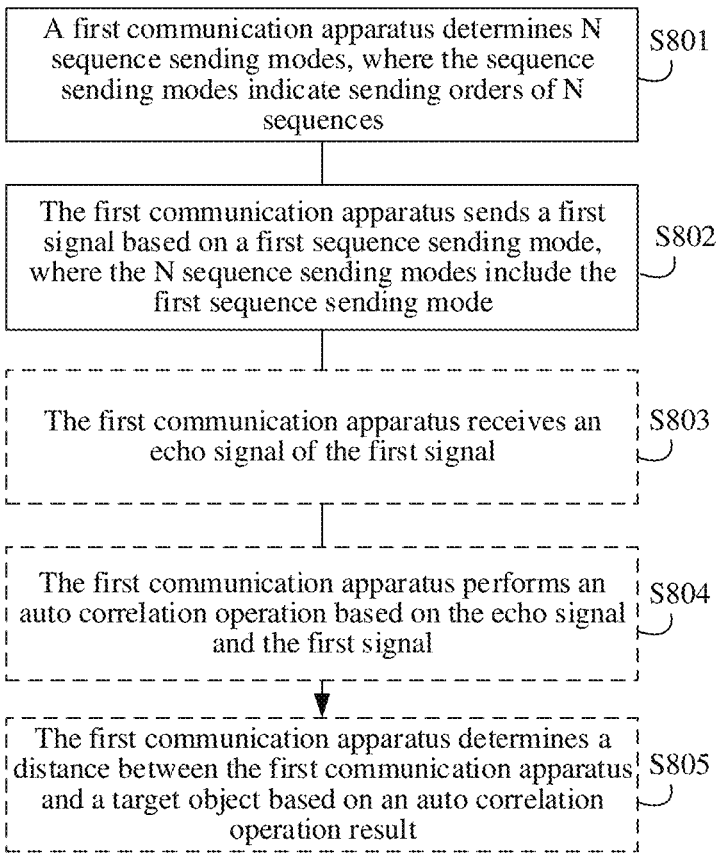

A first communication apparatus determines N sequence sending modes, where the sequence sending modes indicate sending orders of N sequences    S801

The first communication apparatus sends a first signal based on a first sequence sending mode, where the N sequence sending modes include the first sequence sending mode    S802

The first communication apparatus receives an echo signal of the first signal    S803

The first communication apparatus performs an auto correlation operation based on the echo signal and the first signal    S804

The first communication apparatus determines a distance between the first communication apparatus and a target object based on an auto correlation operation result    S805

FIG. 12

SIGNAL SENDING METHOD AND APPARATUS

CROSS-REFERENCE TO RELATED APPLICATIONS

This application is a continuation of International Application No. PCT/CN2023/079124, filed on Mar. 1, 2023, which claims priorities to Chinese Patent Application No. 202210235295.5, filed on Mar. 11, 2022 and Chinese Patent Application No. 202210541739.8, filed on May 17, 2022. All of the aforementioned patent applications are hereby incorporated by reference in their entireties.

TECHNICAL FIELD

Embodiments of the present disclosure relate to the communication field, and in particular, to a signal sending method and an apparatus.

BACKGROUND

A radio detection and ranging (Radar for short) technology is one of the most frequently used radio sensing technologies currently. A principle thereof is described as follows: A radar transmits a sensing signal to specific space, the sensing signal is reflected to form an echo signal after reaching a target, and the radar receives the echo signal, and performs a correlation operation on the echo signal and the sensing signal to obtain spatial information of the target.

A single-carrier waveform is a frequently used radar sensing waveform. When the single-carrier waveform is used to perform sensing, the radar generates a single-carrier sensing signal based on a sequence. A correlation property of the single-carrier sensing signal is determined by using a correlation property of the sequence. To improve sensing accuracy, the radar is usually required to generate a single-carrier sensing signal by using a sequence having a good auto correlation property. In addition, to reduce interference between a plurality of radars, it is required that there be a good cross-correlation property between different sequences used by different radars.

However, a sequence having both a perfect auto correlation property and a perfect cross-correlation property has not been found currently. Generally, a better auto correlation property of a sequence indicates a poorer cross-correlation property between the sequence and another sequence; and a poorer auto correlation property of a sequence indicates a better cross-correlation property between the sequence and another sequence.

Therefore, when a sensing signal is generated based on an existing sequence, a proper signal sending solution needs to be designed, to improve sensing performance.

SUMMARY

The present disclosure provides a signal sending method and an apparatus, so that a communication apparatus can send different sequences in different periods. In this way, sensing performance is improved.

According to a first aspect, a signal sending method is provided. The method may be performed by a first communication apparatus, may be performed by a part of a first communication apparatus, for example, a processor, a chip, a chip system, or the like of the first communication apparatus, or may be implemented by a logic module or software that can implement all or a part of functions of a first communication apparatus. The method includes: determining N sequence sending modes, and sending a first signal based on a first sequence sending mode. The N sequence sending modes include the first sequence sending mode. The sequence sending modes indicate sending orders of N sequences, the N sequences are sent by the first communication apparatus in N periods, and N is a positive integer greater than 1. A cyclic shift value between sending orders indicated by any two adjacent sequence sending modes is 1. The first sequence sending mode is determined based on K second sequence sending modes and the N sequence sending modes, the N sequence sending modes include the K second sequence sending modes, the second sequence sending mode is a sequence sending mode corresponding to a second communication apparatus, and K is a positive integer.

Based on the foregoing solution, the first communication apparatus sends the first signal based on the first sequence sending mode in the N sequence sending modes. Because the sequence sending modes may indicate the sending orders of the N sequences, the sending of the first signal based on the first sequence sending mode may enable the first signal to carry (or include) N different sequences. When the first signal is used for sensing, and the N sequences are not perfect auto correlation sequences, a ratio of an auto correlation side lobe to an auto correlation peak may be reduced. In this way, sensing accuracy is improved. When the N sequences have poor cross-correlation, a ratio of a cross-correlation result to the auto correlation peak can be reduced. In this way, interference between different communication apparatuses is reduced. In addition, the first sequence sending mode may be determined based on at least one second sequence sending mode corresponding to the second communication apparatus, so that different communication apparatuses may use different sequences in a same period. In this way, the interference between the different communication apparatuses is further reduced. In other words, according to the solution provided in the present disclosure, sensing performance can be improved by improving the sensing accuracy or reducing the interference between the different communication apparatuses.

In an example embodiment, when K is equal to 1, a cyclic shift value between the first sequence sending mode and the one second sequence sending mode is the largest. Based on the example embodiment, the first sequence sending mode having the largest cyclic shift value with the second sequence sending mode is selected, so that interference between the first communication apparatus and the second communication apparatus may be reduced as much as possible.

In an example embodiment, when K is greater than 1, a sum of cyclic shift values between the first sequence sending mode and all second sequence sending modes is the largest. Based on the example embodiment, interference between the first communication apparatus and a plurality of second communication apparatuses may be reduced as much as possible.

In an example embodiment, when K is greater than 1, a cyclic shift value between the first sequence sending mode and a target second sequence sending mode is the largest, where the target second sequence sending mode is a sequence sending mode whose corresponding interference power is the strongest in the K second sequence sending modes.

Based on the example embodiment, the sequence sending mode whose corresponding interference power is the strongest causes greatest interference to the first communication apparatus. Therefore, the first sequence sending mode having the largest cyclic shift value with the target second sequence sending mode is selected, so that an interference degree may be reduced as much as possible. In this way, the sensing performance is improved.

In an example embodiment, the first signal includes sub-signals in the N periods, a sub-signal in an $n^{th}$ period is generated by using an $n^{th}$ sequence indicated by the first sequence sending mode, and n=0.1 .... N−1.

In an example embodiment, the N sequences are first-type sequences, the $n^{th}$ sequence includes P repeated first-type sequences, and P is a positive integer greater than 1.

Based on the example embodiment, when a first-type sequence has a good periodic auto correlation property, a correlation operation performed on the first signal and an echo signal of the first signal may be a periodic auto correlation operation, so that a perfect or good periodic auto correlation property of the first-type sequence is properly used. This improves the sensing performance.

In an example embodiment, the N sequences are second-type sequences, the $n^{th}$ sequence includes P repeated second-type sequences, a sending interval between the P repeated second-type sequences is greater than or equal to a duration occupied for sending the second-type sequence, and P is a positive integer greater than 1.

Based on the example embodiment, when a second-type sequence has a good aperiodic auto correlation property, a correlation operation performed on the first signal and an echo signal of the first signal may be an aperiodic auto correlation operation, so that a perfect or good aperiodic auto correlation property of the first-type sequence is properly used. This improves the sensing performance.

In an example embodiment, before the sending a first signal based on a first sequence sending mode, the method further includes: receiving a first sequence sent by the second communication apparatus, and determining the second sequence sending mode based on the first sequence. The first sequence is one of the N sequences. A $1^{st}$ sequence indicated by the second sequence sending mode is the first sequence.

In an example embodiment, the receiving a first sequence sent by the second communication apparatus includes: monitoring, based on a first period, a sequence sent by the second communication apparatus. The first sequence is a sequence detected in the first period. The first period is greater than or equal to a sending duration of the first signal. The first period is an interval between two adjacent times of monitoring.

In an example embodiment, that the second sequence sending mode is a sequence sending mode corresponding to a second communication apparatus includes: the second sequence sending mode is a sequence sending mode used by the second communication apparatus; or the second sequence sending mode is a sequence sending mode obtained by performing cyclic shift on a sequence sending mode used by the second communication apparatus.

In an example embodiment, the method further includes: receiving an echo signal of the first signal; performing an auto correlation operation based on the echo signal and the first signal; and determining a distance between the first communication apparatus and a target object based on an auto correlation operation result.

In an example embodiment, the first communication apparatus is a radar, or the first communication apparatus is a terminal device or a network device having a radar function.

In an example embodiment, the first signal is a signal used for radar ranging.

In an example embodiment, the N sequences include one of an M sequence, a Gold sequence, a golay complementary pair GCP sequence, or an Ipatov sequence.

According to a second aspect, a communication apparatus is provided, to implement various methods in the foregoing. The communication apparatus may be a first communication apparatus, or an apparatus included in a first communication apparatus, for example, a chip. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

In some example embodiments, the communication apparatus may include a processing module and a transceiver module. The transceiver module may also be referred to as a transceiver unit, and is configured to implement a sending function and/or a receiving function in any one of the foregoing aspects and any possible implementation of the foregoing aspects. The transceiver module may include a transceiver circuit, a transceiver machine, a transceiver, or a communication interface. The processing module may be configured to implement a processing function in any one of the foregoing aspects and any possible implementation of the foregoing aspects.

In some example embodiments, the transceiver module includes a sending module and a receiving module, respectively configured to implement the sending function and the receiving function in any one of the foregoing aspects and any possible implementation of the foregoing aspects.

According to a third aspect, a communication apparatus is provided. The communication apparatus includes a processor and a memory. The memory is configured to store computer instructions. When the processor executes the instructions, the communication apparatus is enabled to perform the method in any one of the foregoing aspects. The communication apparatus may be a first communication apparatus, or an apparatus included in a first communication apparatus, for example, a chip.

According to a fourth aspect, a communication apparatus is provided, including a processor and a communication interface. The communication interface is configured to communicate with a module other than the communication apparatus. The processor is configured to execute a computer program or instructions, so that the communication apparatus performs the method in any one of the foregoing aspects. The communication apparatus may be a first communication apparatus, or an apparatus included in a first communication apparatus, for example, a chip.

According to a fifth aspect, a communication apparatus is provided, including an interface circuit and a processor. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. The processor is configured to execute the computer-executable instructions, so that the communication apparatus performs the method in any one of the foregoing aspects. The communication apparatus may be a first communication apparatus, or an apparatus included in a first communication apparatus, for example, a chip.

According to a sixth aspect, a communication apparatus is provided, including at least one processor. The processor is configured to execute a computer program or instructions, so that the communication apparatus performs the method in any one of the foregoing aspects. The communication apparatus may be a first communication apparatus, or an apparatus included in a first communication apparatus, for example, a chip.

In some example embodiments, the communication apparatus includes a memory, and the memory is configured to store necessary program instructions and data. The memory may be coupled to the processor, or may be independent of the processor.

In some example embodiments, the communication apparatus may be a chip or a chip system. When the apparatus is the chip system, the apparatus may include a chip, or may include a chip and another discrete component.

According to a seventh aspect, a computer-readable storage medium is provided. The computer-readable storage medium stores instructions. When the instructions are run on a communication apparatus, the communication apparatus is enabled to perform the method in any one of the foregoing aspects.

According to an eighth aspect, a computer program product including instructions is provided. When the computer program product is run on a communication apparatus, the communication apparatus is enabled to perform the method in any one of the foregoing aspects.

It may be understood that when the communication apparatus provided in any one of the second aspect to the eighth aspect is a chip, the foregoing sending action/function may be understood as output information, and the foregoing receiving action/function may be understood as input information.

For technical effects brought by any one of the design manners of the second aspect to the eighth aspect, refer to technical effects brought by the different design manners of the first aspect.

BRIEF DESCRIPTION OF DRAWINGS

FIG. 12 is a schematic flowchart of another example signal sending method according to an embodiment of the present disclosure;

DESCRIPTION OF EMBODIMENTS

Figure 1:
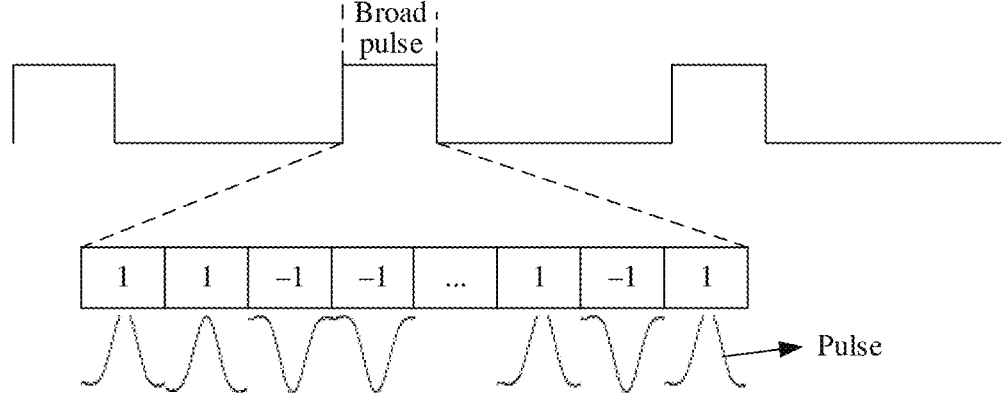
FIG. 1 is an example diagram of a single-carrier sensing signal according to an embodiment of the present disclosure.

In descriptions of the present disclosure, unless otherwise specified, a character "/" indicates that associated objects are in an "or" relationship. For example, A/B may represent A or B. A term "and/or" in the present disclosure merely describes an association relationship between associated objects and indicates that three relationships may exist. For example, A and/or B may represent three cases: Only A exists, both A and B exist, or only B exists, where A and B may be singular or plural.

In the present disclosure, unless otherwise specified, "a plurality of" means two or more than two. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, and a and b and c, where a, b, and c may be singular or plural.

In addition, for ease of clearly describing the technical solutions in embodiments of the present disclosure, words such as "first", "second", and the like are used in embodiments of the present disclosure to distinguish between same items or similar items that have basically same functions and purposes. A person skilled in the art may understand that the words such as "first", "second", and the like do not limit a quantity and an execution sequence, and the words such as "first", "second", and the like do not indicate a definite difference.

In embodiments of the present disclosure, the word "example", "for example", or the like is used to represent giving an example, an illustration, or a description. Any embodiment or design solution described as an "example" or "for example" in embodiments of the present disclosure should not be explained as being more preferred or having more advantages than another embodiment or design solution. Exactly, use of the word such as "example", "for example", or the like is intended to present a related concept in a specific manner for ease of understanding.

It may be understood that an "embodiment" used throughout this specification means that particular features, structures, or characteristics related to this embodiment are included in at least one embodiment of the present disclosure. Therefore, embodiments in the entire specification are not necessarily a same embodiment. In addition, these particular features, structures, or characteristics may be combined in one or more embodiments in any proper manner. It may be understood that sequence numbers of the processes do not mean execution sequences in various embodiments of the present disclosure. The execution sequences of the processes should be determined based on functions and internal logic of the processes, and should not be construed as any limitation on implementation processes of embodiments of the present disclosure.

It may be understood that in some scenarios, some optional features in embodiments of the present disclosure may be independently implemented without depending on another feature, for example, a solution on which the optional features are currently based, to resolve a corresponding technical problem and achieve corresponding effects. Alternatively, in some scenarios, the optional features may be combined with other features based on a requirement. Correspondingly, an apparatus provided in embodiments of the present disclosure may also correspondingly implement these features or functions. Details are not described herein.

In the present disclosure, unless otherwise specified, for same or similar parts in embodiments, refer to each other. In embodiments of the present disclosure, unless otherwise stated or there is a logic conflict, terms and/or descriptions between different embodiments are consistent and may be mutually referenced, and technical features in different embodiments may be combined based on an internal logical relationship thereof, to form a new embodiment. The following implementations of the present disclosure are not intended to limit the protection scope of the present disclosure.

For ease of understanding the technical solutions in embodiments of the present disclosure, the following first briefly describes conventional technologies in the present disclosure.

(1) Sequence: A sequence may include a plurality of pieces of discrete data, and one piece of data may be referred to as one element of the sequence. According to a value of the element, the sequence may be generally classified into a binary sequence (the value of the element is 1 or −1), a ternary sequence (the value of the element is 1, −1, or 0), and a multi-ary sequence (there are more than three values of the element).

(2) Correlation operation: A correlation operation is to multiply corresponding elements of two sequences and then add multiplication results. For example, it is assumed that there are a sequence a=[$a_1$, $a_2$, $a_3$] and a sequence b=[$b_1$,$b_2$, $b_3$]. In this case, a correlation operation between the two sequences is $a_1 \times b_1 + a_2 \times b_2 + a_3 \times b_3$.

(3) Periodic correlation operation: When a correlation operation is performed on sequences, a correlation value of two sequences is calculated based on a relative cyclic shift between the sequences. If lengths of the sequences are L, the relative cyclic shift between the sequences may include 2L−1 cases in total: −L+1, −1+2, . . . , −1, 0, 1, . . . , 1-2, and L−1. Therefore, there are a total of 2L−1 values for a periodic correlation operation of the sequences.

For example, it is assumed that there are a sequence a=[$a_1$,$a_2$, $a_3$] and a sequence b=[$b_1$,$b_2$,$b_3$]. In this case, a relative cyclic shift between the two sequences includes five possibilities in total: −2, −1, 0, 1, and 2. Correspondingly, there are 5 results for a periodic correlation operation of the two sequences.

When the relative cyclic shift is −2, a corresponding case is as follows:

$a_2$,$a_3$,$a_1$
$b_1$,$b_2$,$b_3$

In this case, a periodic correlation result is: $a_2 \times b_1 + a_3 \times b_2 + a_1 \times b_3$ When the relative cyclic shift is −1, a corresponding case is as follows:

$a_3$,$a_1$,$a_2$
$b_1$,$b_2$,$b_3$

In this case, a periodic correlation result is: $a_3 \times b_1 + a_1 \times b_2 + a_2 \times b_3$ When the relative cyclic shift is 0, a corresponding case is as follows:

$a_1$,$a_2$,$a_3$
$b_1$, $b_2$, $b_3$

In this case, a periodic correlation result is: $a_1 \times b_1 + a_2 \times b_2 + a_3 \times b_3$ When the relative cyclic shift is 1, a corresponding case is as follows:

$a_2$,$a_3$,$a_1$
$b_1$,$b_2$,$b_3$

In this case, a periodic correlation result is: $a_2 \times b_1 + a_3 \times b_2 + a_1 \times b_3$ When the relative cyclic shift is 2, a corresponding case is as follows:

$a_3$,$a_1$,$a_2$
$b_1$,$b_2$,$b_3$

In this case, a periodic correlation result is: a $3 \times b_1 + a_1 \times b_2 + a_2 \times b_3$ (4) Aperiodic correlation operation: When a correlation operation is performed on sequences, a correlation value of an overlapping element in two sequences is calculated based on a relative shift between the sequences. If lengths of the sequences are L, the relative shift between the sequences may include 2L−1 cases in total: −L+1, −L+2, . . . , −1, 0, 1, . . . , L−2, and L−1. Therefore, there are a total of 2L−1 values for an aperiodic correlation operation of the sequences.

For example, it is assumed that there are a sequence a=[$a_1$, $a_2$, $a_3$] and a sequence b=[$b_1$,$b_2$, $b_3$] In this case, a relative cyclic shift between the two sequences includes five possibilities in total: −2, −1, 0, 1, and 2. Correspondingly, there are 5 results for a periodic correlation operation of the two sequences.

When the relative shift is −2, a corresponding case is as follows:

$a_1$,$a_2$,$a_3$
$b_1$, $b_2$,$b_3$

In this case, an aperiodic correlation result is: $a_1 \times b_3$

When the relative shift is −1, a corresponding case is as follows:

$a_1, a_2, a_3$ $b_1, b_2, b_3$

In this case, an aperiodic correlation result is: $a_1 \times b_2 + a_2 \times b_3$ When the relative shift is 0, a corresponding case is as follows:

$a_1, a_2, a_3$ $b_1, b_2, b_3$

In this case, an aperiodic correlation result is: $a_1 \times b_1 + a_2 \times b_2 + a_3 \times b_3$ When the relative shift is 1, a corresponding case is as follows:

$a_1, a_2, a_3$ $b_1, b_2, b_3$

In this case, an aperiodic correlation result is: $a_2 \times b_1 + a_3 \times b_2$ When the relative shift is 2, a corresponding case is as follows:

$a_1, a_2, a_3$ $b_1, b_2, b_3$

In this case, an aperiodic correlation result is: $a_3 \times b_1$

It may be understood that, for two sequences, if cyclic shift is simultaneously performed on one of the two sequences during relative shift, enabling a quantity of overlapping elements of the two sequences is always equal to a sequence length, a correlation operation of the two sequences is a periodic correlation operation. If cyclic shift is not performed during relative shift, in other words, a quantity of overlapping elements of two sequences decreases as the relative shift increases, a correlation operation of the two sequences is an aperiodic correlation operation.

(5) Periodic auto correlation: If two sequences are the same, a periodic correlation operation between the two sequences is referred to as periodic auto correlation.

(6) Periodic cross-correlation: If two sequences are different, a periodic correlation operation between the two sequences is referred to as periodic cross-correlation.

(7) Aperiodic auto correlation: If two sequences are the same, an aperiodic correlation operation between the two sequences is referred to as aperiodic auto correlation.

(8) Aperiodic cross-correlation: If two sequences are different, the aperiodic correlation operation between the two sequences is referred to as aperiodic cross-correlation.

(9) Perfect periodic auto correlation: If a periodic auto correlation result of a sequence is 0 at another shift location other than a 0 shift location, the sequence has a perfect periodic auto correlation property. If a periodic auto correlation result of a sequence is not 0 at another shift location other than a 0 shift location, but a value at the another shift location is very small compared with a peak value at the 0 shift location, the sequence has a good periodic auto correlation property.

(10) Perfect periodic cross-correlation: If a periodic cross-correlation result of two sequences is 0 at all shift locations, the two sequences have perfect periodic cross-correlation properties, or the two sequences are orthogonal to each other. If a periodic cross-correlation result of two sequences has small values at all shift locations, the two sequences have good periodic cross-correlation properties.

(11) Perfect aperiodic auto correlation: If an aperiodic auto correlation result of a sequence is 0 at another shift location other than a 0 shift location, the sequence has a perfect aperiodic auto correlation property. If an aperiodic auto correlation result of a sequence is not 0 at another shift location other than a 0 shift location, but a value at the another shift location is very small compared with a peak value at the 0 shift location, the sequence has a good aperiodic auto correlation property.

(12) Perfect aperiodic cross-correlation: If an aperiodic cross-correlation result of two sequences is 0 at all shift locations, the two sequences have perfect aperiodic cross-correlation properties, or the two sequences are orthogonal to each other. If an aperiodic cross-correlation result of two sequences has small values at all shift locations, the two sequences have good aperiodic cross-correlation properties.

(13) Periodic cross-correlation peak: For two sequences whose lengths are L, a maximum value in absolute values of $2L-1$ periodic cross-correlation results of the two sequences is referred to as a periodic cross-correlation peak.

(14) Aperiodic cross-correlation peak: For two sequences whose lengths are L, a maximum value in absolute values of $2L-1$ aperiodic cross-correlation results of the two sequences is referred to as an aperiodic cross-correlation peak.

It should be noted that, when a specific sequence is not specified in the present disclosure, periodic auto correlation or aperiodic auto correlation is collectively referred to as auto correlation, and periodic cross-correlation or aperiodic cross-correlation is collectively referred to as cross-correlation. In addition, for the auto correlation, an auto correlation result obtained when a shift is not 0 is referred to as an auto correlation side lobe in the present disclosure.

Currently, a radar may generate a single-carrier sensing signal in a phase modulation manner. For example, as shown in FIG. 1, a radar may send a pulse signal with a corresponding phase based on an element in a sequence. For example, when the element in the sequence is 1, a positive pulse is sent. When the element in the sequence is −1, a negative pulse is sent. Pulses corresponding to all elements in the sequence are superposed to obtain a broad pulse. The pulse may be a rectangular pulse, a Gaussian pulse, a root raised cosine pulse, or the like. This is not limited. In this generation manner, because shapes of pulses corresponding to different sequence elements are the same, a correlation property of the single-carrier sensing signal is determined by the sequence.

The radar may send a sensing signal and receive an echo signal of the sensing signal, perform auto correlation calculation on the sensing signal and the echo signal, and determine information such as a distance of a target or the like by searching for a location at which a maximum auto correlation peak appears. If an auto correlation property of the sequence used when the sensing signal is generated is poor, an auto correlation side lobe may be large. This causes reduction of sensing accuracy. Therefore, to improve the sensing accuracy, a sequence is required to have a good auto correlation property.

Figure 2:
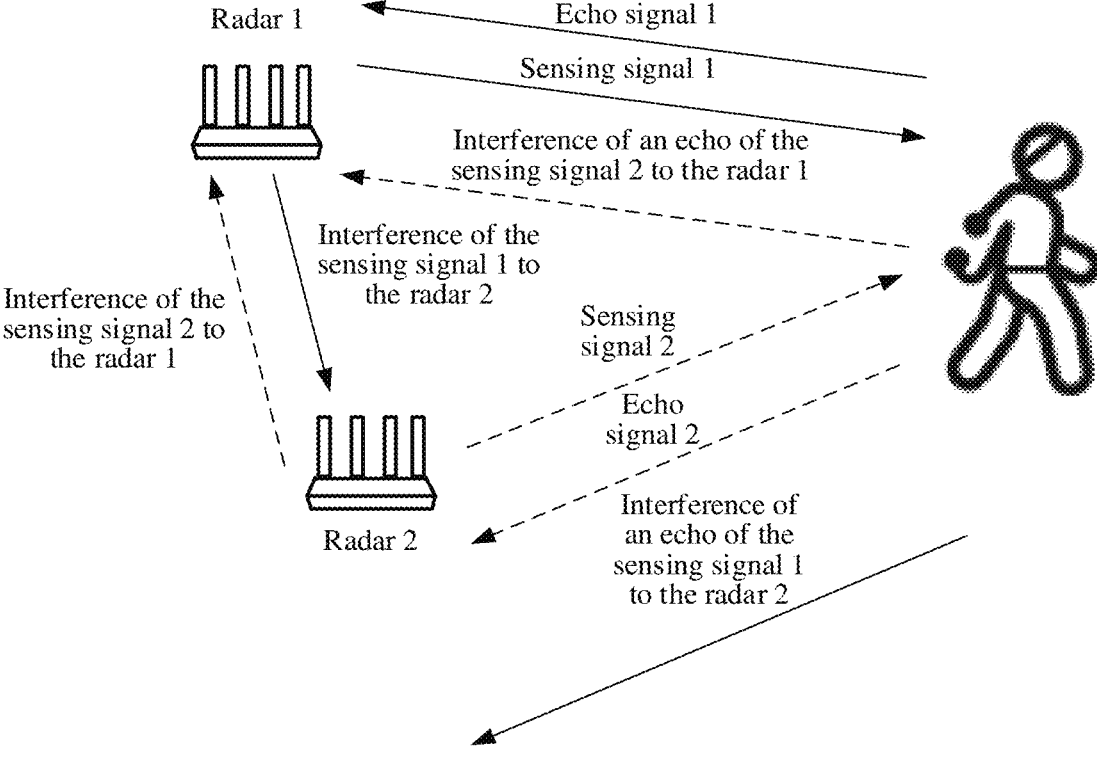
FIG. 2 is an example diagram of interference between a plurality of radars according to the present disclosure.

In addition, when a plurality of radars performs sensing, mutual interference exists between the radars. For example, as shown in FIG. 2, a sensing signal 1 sent by a radar 1 causes interference to a radar 2, and an echo that is in a direction of the radar 2 and that is obtained by reflecting the sensing signal 1 by a target also causes interference to the radar 2. Similarly, a sensing signal 2 sent by the radar 2 causes interference to the radar 1, and an echo that is in a direction of the radar 1 and that is obtained by reflecting the sensing signal 2 by the target also causes interference to the radar 1.

To reduce interference between a plurality of radars, different radars usually use different sequences to generate sensing signals. In this case, a cross-correlation property between the different sequences determines a level of an interference signal. Therefore, to further reduce interference between radars, it is required that there be a good cross-correlation property between different sequences used by different radars.

However, a sequence having both a perfect auto correlation property and a perfect cross-correlation property has not been found currently. Generally, a better auto correlation property of a sequence indicates a poorer cross-correlation property between the sequence and another sequence; and a poorer auto correlation property of a sequence indicates a better cross-correlation property between the sequence and another sequence.

For example, for a frequently-used M sequence, Ipatov sequence, Gold sequence, a golay complementary pair (GCP) sequence, and the like, the M sequence, the Ipatov sequence, and the GCP sequence have good auto correlation properties, but poor cross-correlation properties. The Gold sequence has a good cross-correlation property, but a poor auto correlation property. Therefore, when an existing sequence is used to generate a single-carrier sensing signal, a sequence sending manner needs to be designed, to improve sensing performance.

The GCP is a dual-channel sequence, has a perfect aperiodic auto correlation property, and is defined as follows. For a pair of sequences x and y whose code lengths are L, if a sum of aperiodic auto correlation functions (AACFs) of the sequences is 0 at another shift location other than a 0 shift location, the sequences x and y are a piece of (pair of) GCP.

Figure 3:
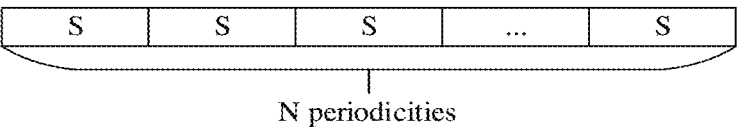
FIG. 3 is an example diagram of a timing of repeatedly sending a sequence S according to an embodiment of the present disclosure.

To improve a signal-to-noise ratio (SNR) of a receiving end, in a conventional solution, a sensing signal usually includes a signal repeatedly sent in a plurality of periods, in other words, a sequence repeatedly sent by a transmitting end in a plurality of periods. For example, as shown in FIG. 3, a radar sends, in each period of N periods, a signal generated based on a sequence S. In each period, the radar may send a pulse signal with a corresponding phase based on an element in the sequence S. Refer to related descriptions in FIG. 1.

At a receiving end, the radar separately performs an auto correlation operation on a received signal (including an echo signal and noise) and a sensing signal for the N periods, to obtain N auto correlation results, and accumulates the N auto correlation results. Because the total duration of the N periods is very small, and is generally in a nanosecond or microsecond level, it may be considered that a location of a sensed target in the N periods is not changed. Therefore, when the auto correlation operation is separately performed for the N periods, a location at which a maximum auto correlation peak appears in each period is the same. After the N auto correlation results are accumulated, a maximum correlation peak may be increased by N times. In addition, noise is randomly distributed, and the noise does not increase after the accumulation. Therefore, an SNR of the receiving end can be increased in this sending manner.

It should be noted that, in the present disclosure, performing a correlation operation on a signal may also be understood as performing a correlation operation on a sequence used to generate the signal, or performing a correlation operation on a sequence carried in the signal. Sending a signal generated based on a sequence may also be understood as sending a sequence.

Based on this idea, for a sequence having a good cross-correlation property, like a Gold sequence, auto correlation side lobes of different Gold sequences appear randomly, that is, at a same shift location, values of the auto correlation side lobes of the different Gold sequences are different and the auto correlation side lobes of the different Gold sequences are not simultaneously positive or negative. Therefore, if signals generated based on the different Gold sequences are sent in N periods, and auto correlation results of the N periods are accumulated at a receiving end, a maximum auto correlation peak may still be increased by N times. However, because the auto correlation side lobes appear randomly, the auto correlation side lobes are not increased by N times.

If a conventional solution is used, that is, a signal generated based on a same Gold sequence is sent in N periods, and auto correlation results of the N periods are accumulated at a receiving end, because auto correlation results in all periods are the same, both an auto correlation peak and an auto correlation side lobe are increased by N times after the accumulation. In comparison with a case in which a signal generated based on a Gold sequence is sent once in one period, a ratio of an auto correlation side lobe to an auto correlation peak is not changed.

In other words, after signals generated based on different Gold sequences are sent in N periods, and auto correlation results of the N periods are accumulated at the receiving end, a ratio of an auto correlation side lobe to an auto correlation peak is reduced compared with that in the conventional solution.

Figure 4A:
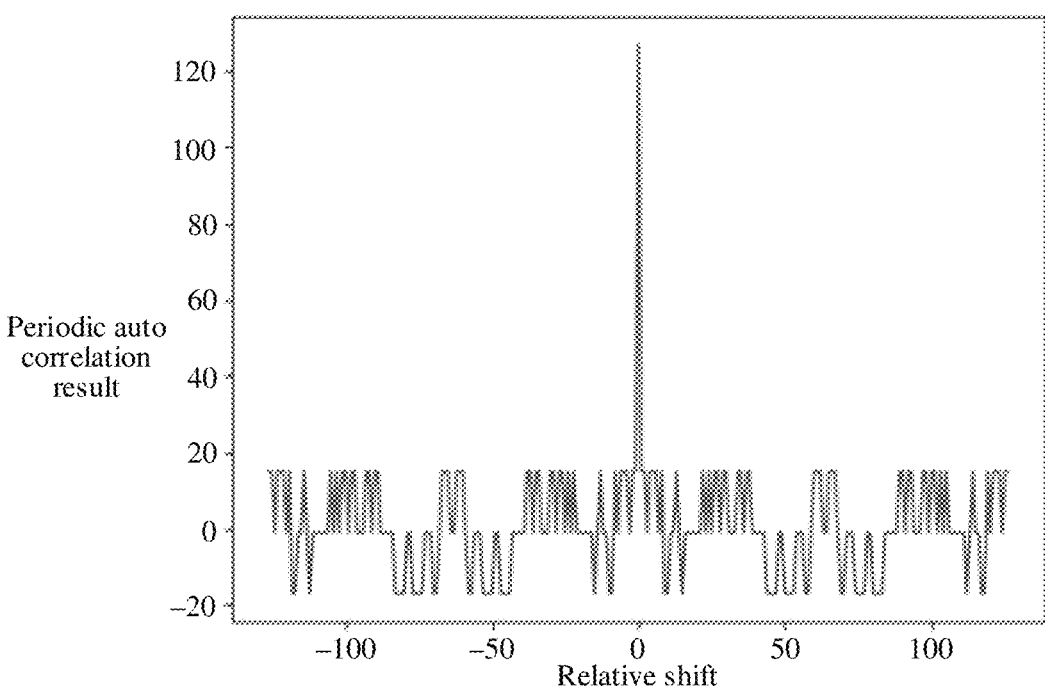
FIG. 4a is an example diagram of a periodic auto correlation result of a Gold sequence according to an embodiment of the present disclosure.
Figure 4B:
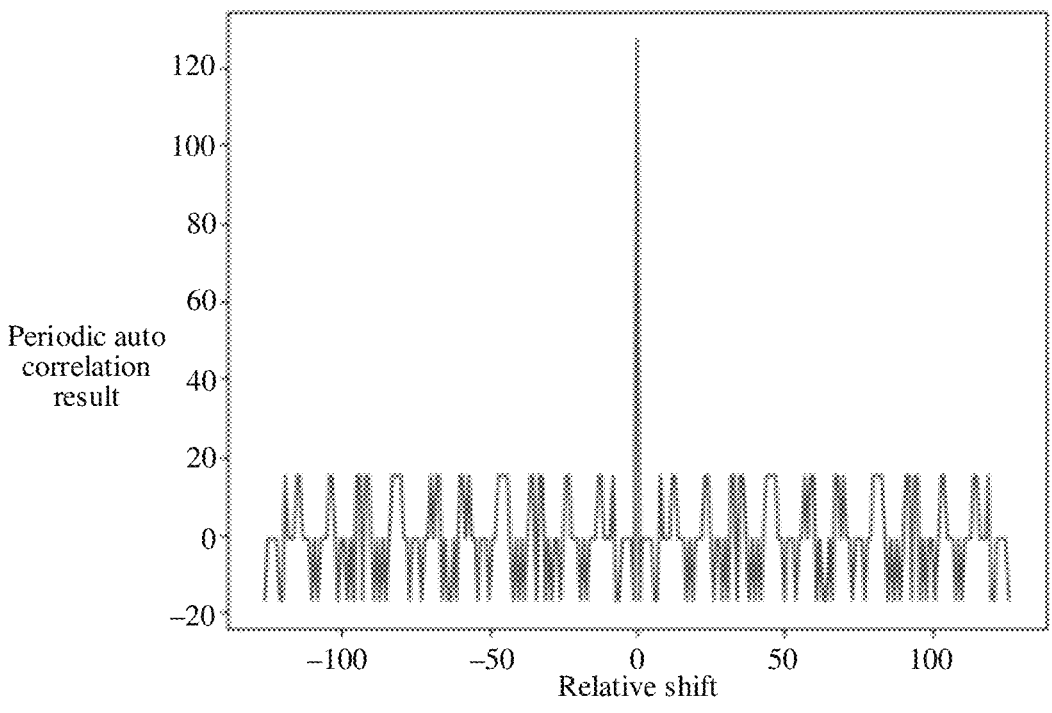
FIG. 4b is an example diagram of a periodic auto correlation result of another Gold sequence according to an embodiment of the present disclosure.
Figure 4C:
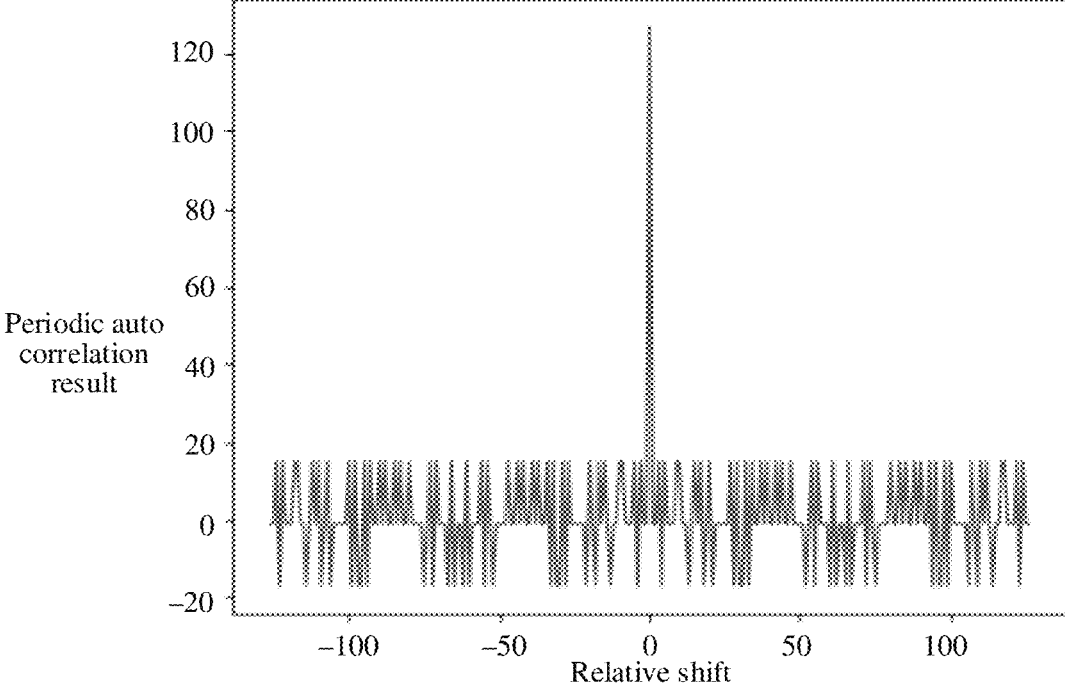
FIG. 4c is an example diagram of a periodic auto correlation result of still another Gold sequence according to an embodiment of the present disclosure.

For example, FIG. 4a to FIG. 4c respectively show diagrams of simulation of periodic auto correlation results of a Gold sequence 1, a Gold sequence 2, and a Gold sequence 3. It can be learned from FIG. 4a to FIG. 4c that locations (at a 0 shift location) of auto correlation peaks of the Gold sequence 1, the Gold sequence 2, and the Gold sequence 3 are the same and values of the auto correlation peaks are equal, and auto correlation side lobes at another shift location have irregular values and are irregularly positive or negative. Therefore, if periodic auto correlation results of the three Gold sequences are accumulated, an auto correlation peak is increased by three times, and the auto correlation side lobes at the another shift location may increase or decrease. As a quantity of Gold sequences increases, it may be considered according to the law of large numbers that auto correlation side lobes at another shift location tend to remain unchanged after accumulation. Therefore, after periodic auto correlation results of the N Gold sequences are accumulated, an auto correlation peak is increased by N times, and an auto correlation side lobe is not changed. This is equivalent to reducing a ratio of the auto correlation side lobe to the auto correlation peak.

Figure 5A:
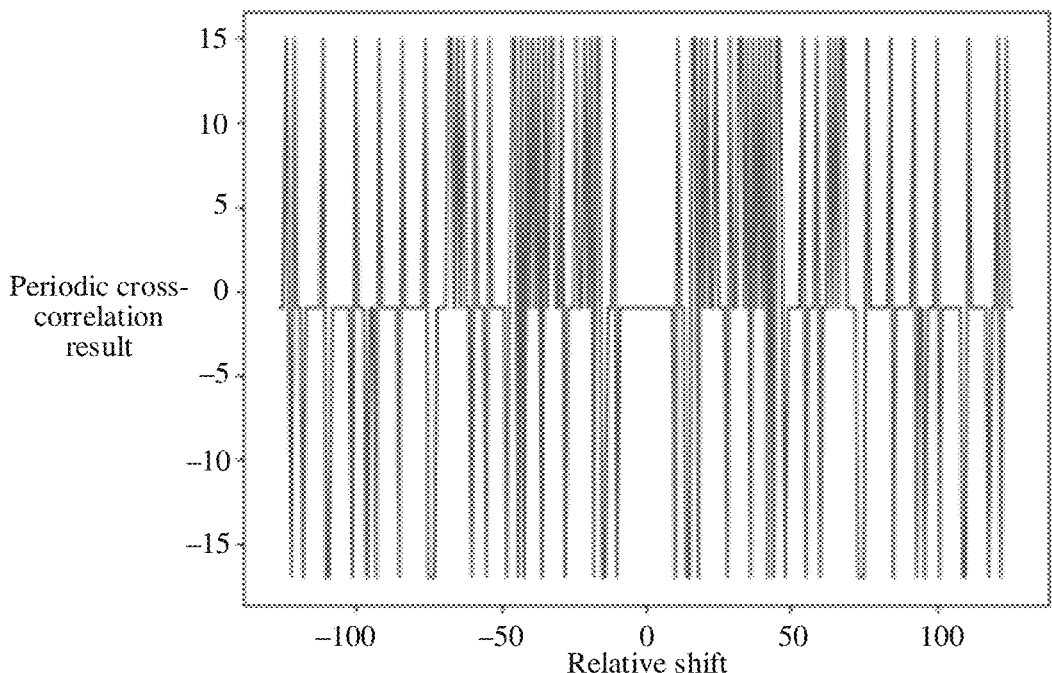
FIG. 5a is an example diagram of a periodic cross-correlation result of a Gold sequence according to an embodiment of the present disclosure.
Figure 5B:
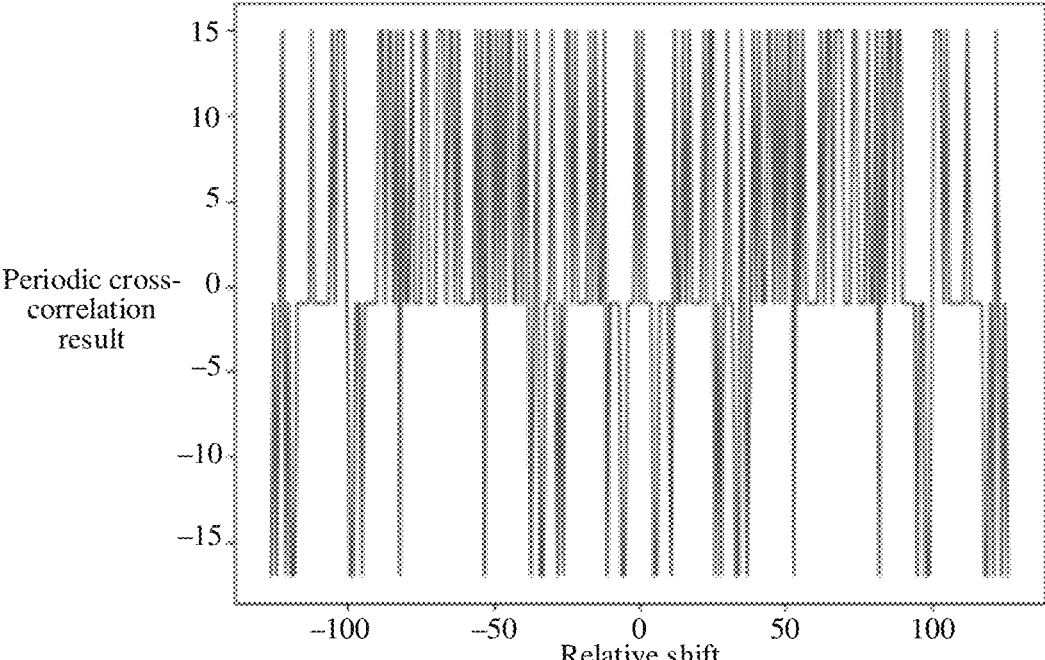
FIG. 5b is an example diagram of a periodic cross-correlation result of another Gold sequence according to an embodiment of the present disclosure.
Figure 5C:
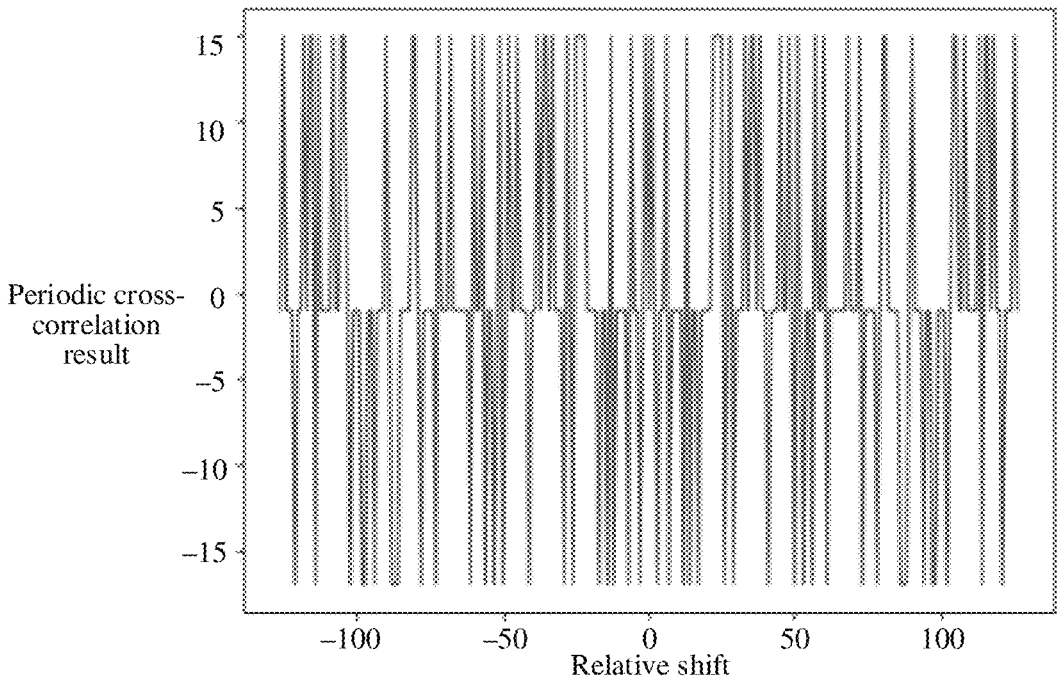
FIG. 5c is an example diagram of a periodic cross-correlation result of still another Gold sequence according to an embodiment of the present disclosure.

In addition, for a sequence having a good cross-correlation property, like a Gold sequence, periodic cross-correlation results of two different Gold sequences may also be considered to appear randomly. For example, FIG. 5a to FIG. 5c respectively show a periodic cross-correlation result of a Gold sequence 1 and a Gold sequence 2, a periodic cross-correlation result of the Gold sequence 1 and a Gold sequence 3, and a periodic cross-correlation result of the Gold sequence 2 and the Gold sequence 3. It can be learned from FIG. 5a to FIG. 5c that periodic cross-correlation results of the three pairs of sequences are different.

Therefore, after the periodic cross-correlation results of the three pairs of sequences are accumulated, a periodic cross-correlation value at each shift location may increase or decrease. As a quantity of Gold sequences increases, it may be considered according to the law of large numbers that a periodic cross-correlation result after accumulation is not changed compared with that before the accumulation.

In other words, when a plurality of radars performs sensing, each radar sends, in N periods, signals generated based on different Gold sequences, and accumulates cross-correlation results in the N periods, and therefore a periodic cross-correlation result is not changed. In addition, because an auto correlation peak is increased by N times in this scenario, a ratio of a periodic cross-correlation value to the auto correlation peak may be reduced. In other words, interference between radars is reduced.

According to the conventional solution, for example, a radar 1 sends, in N periods, a signal generated based on a Gold sequence 1, and a radar 2 sends, in the N periods, a signal generated based on a Gold sequence 2. Because sequences (which are the Gold sequence 1 and the Gold sequence 2) on which a cross-correlation operation is performed in each period are the same, a cross-correlation result is increased by N times after cross-correlation results in the N periods are accumulated. In addition, in this scenario, the auto correlation peak is also increased by N times. Therefore, compared with a case of sending a signal generated based on a Gold sequence once in one period, the ratio of the cross-correlation result to the auto correlation peak is not changed, and the interference between radars is not reduced.

In conclusion, for a sequence having a good cross-correlation property, like a Gold sequence, signals generated based on different Gold sequences are sent in N periods. This can reduce a ratio of an auto correlation side lobe to an auto correlation peak, so that sensing accuracy is improved. This can also reduce a ratio of a cross-correlation result to an auto correlation peak, so that interference between different radars is reduced.

It should be noted that the Gold sequence 1, the Gold sequence 2, and the Gold sequence 3 are respectively as follows.

The Gold sequence 1 is 1, 1, 1, 1, 1, 1, 1, 1, 1, 1, 1, −1, 1, 1, 1, 1, 1, −1, 1, 1, 1, −1, 1, −1, 1, −1, 1, 1, −1, −1, 1, 1, 1, −1, −1, −1, 1, −1, 1, −1, 1, 1, 1, 1, 1, 1, 1, −1, −1, 1, 1, 1, −1, 1, −1, −1, −1, −1, −1, −1, −1, 1, −1, 1, 1, −1, 1, 1, 1, 1, −1, 1, −1, −1, 1, −1, −1, 1, −1, 1, −1, −1, −1, −1, 1, 1, −1, −1, −1, −1, 1, 1, −1, −1, −1, −1, −1, 1, 1, 1, −1, 1, −1, 1, 1, 1, 1, 1, −1, −1, 1, 1, 1, −1, 1, 1, 1, −1, 1, 1, −1, −1, −1, 1, −1, −1, −1.

The Gold sequence 2 is −1, 1, 1, 1, 1, 1, −1, −1, 1, 1, −1, 1, −1, 1, −1, 1, −1, 1, −1, −1, 1, −1, −1, 1, 1, 1, 1, −1, 1, 1, −1, −1, −1, −1, 1, −1, 1, 1, 1, 1, 1, −1, 1, 1, 1, −1, −1, 1, 1, −1, 1, −1, 1, 1, 1, 1, 1, 1, 1, 1, −1, −1, 1, 1, 1, −1, 1, 1, −1, 1, 1, 1, −1, −1, 1, −1, −1, 1, −1, 1, −1, 1, 1, 1, 1, −1, −1, 1, 1, 1, −1, −1, 1, −1, 1, 1, 1, 1, −1, 1, 1, −1, −1, −1, 1, −1, −1, 1, −1, −1, −1, −1, 1, −1, −1, 1, −1, −1, −1.

The Gold sequence 3 is −1, 1, 1, 1, 1, −1, 1, −1, 1, 1, −1, −1, −1, −1, −1, 1, −1, −1, 1, 1, −1, −1, −1, −1, 1, 1, 1, 1, 1, 1, −1, 1, −1, −1, 1, −1, 1, 1, −1, 1, −1, −1, 1, −1, 1, 1, 1, −1, 1, −1, −1, 1, −1, 1, 1, −1, −1, 1, −1, −1, 1, 1, 1, 1, 1, −1, 1, 1, 1, 1, 1, 1, 1, 1, 1, −1, 1, 1, 1, −1, 1, 1, 1, 1, 1, −1, 1, 1, 1, 1, −1, −1, −1, −1, 1, −1, −1, −1, −1, 1, −1, 1, 1, 1, 1, −1, 1, 1, 1, 1, −1, −1, −1, 1, 1, 1, 1, −1, 1, 1, 1, 1, −1, −1, 1, −1, −1, 1.

For a sequence with a fixed auto correlation side lobe (for example, an absolute value is fixed to 0 or 1) like an M sequence, an Ipatov sequence, or a GCP sequence, signals generated based on different sequences are sent in N periods, so that a ratio of a cross-correlation result to an auto correlation peak may be reduced.

Based on the foregoing analysis, signals generated based on different sequences are sent in different periods, or different sequences are sent in different periods, so that sensing performance can be improved. However, in an existing sequence sending manner, different sequences may not be sent in different periods.

For example, group hopping and sequence hopping solutions are defined in an existing 5th generation (5G) new radio (NR) protocol, to facilitate user equipment (UE) to use different sequences in different slots. For example, in a channel sounding reference signal (SRS) of NR, the following group hopping solution is used to send a sequence.

A number of a sequence sent by the UE in an $n_s^{th}$ slot is $f(n_s) = \Sigma_{i=0}^7 c(8n_s+i) \cdot 2^i$. c(n) is a pseudo-random sequence, and may be generated by using two pseudo-random sequences $x_1(n)$ and $x_2(n)$ in the following manner:

$$c(n) = (x_1(n + 1600) + x_2(n + 1600)) \bmod 2$$

$x_1(n)$ may be generated in the following manner: initializing $x_1(0)=1, x_1(n)=0, n=1, 2, \ldots 30$. After the initialization is completed, other results of x(n) may be generated by using $x_1(n+31)=(x_1(n+3)+x(n)) \bmod 2$ recursively.

$x_2(n)$ may be generated in the following manner: initializing $x_2(n)=0, n=0, 1, 2, \ldots 30$ based on a given $C_{init}$, for example, $C_{init}=\Sigma_{i=0}^{30} x_2(i) 2^i$. In other words, decimal $C_{init}$ is represented by using a 31-bit binary number, and the 31-bit binary number sequentially corresponds to $x_2(n)=0$, $n=0, 1, 2, \ldots 30$ from the least significant bit to the most significant bit. $C_{init}$ is determined by a number of the UE, and $C_{init}$ may be set to be equal to the number of the UE in actual application.

After the initialization is completed, other results of $x_2(n)$ may be generated by using $x_2(n+31)=(x_2(n+3)+x_2(n+2)+x_2(n)) \bmod 2$ recursively.

Currently, the group hopping solution and the sequence hopping solution in the foregoing NR protocol are usually adaptively modified, to be applicable to sequence sending in a sensing scenario. For example, $n_s$ represents a slot in the NR protocol, and represents an $n_s^{th}$ period in the sensing scenario. $C_{init}$ is determined by the number of the UE in the NR protocol, and may be determined by a number of a radar in the sensing scenario, or the like.

In the foregoing sequence sending manner based on the NR protocol in the sensing scenario, the radar determines, based on the pseudo-random sequence, a sequence used in each period. Therefore, the sequence sending manner is essentially a random sequence selection method. Therefore, in this solution, there is a probability that a same radar uses a same sequence in different periods, and there is also a probability that different radars use a same sequence in a same period.

Based on this, the present disclosure provides a signal sending method, so that a same device sends different sequences in different periods, and different devices use different sequences in a same period. This reduces a ratio of an auto correlation side lobe to an auto correlation peak, so that sensing accuracy is improved. Alternatively, this reduces a ratio of a cross-correlation result to an auto correlation peak, so that interference between different radars is reduced.

The technical solution in embodiments of the present disclosure may be applied to various communication systems. The communication system may be a 3rd generation partnership project (3GPP) communication system, for example, a 5G or 6th generation (6G) mobile communication system or a sidelink (SL) system, an ultra-wideband (UWB) system, a vehicle to everything (V2X) system, or a device-to-device (D2D) communication system, a machineto-machine (M2M) communication system, an internet of things (IoT), or another next generation communication system. The communication system may alternatively be a non-3GPP communication system, for example, a wireless local area network (WLAN) system like Wi-Fi. This is not limited.

The technical solution in embodiments of the present disclosure may be applied to various communication scenarios, for example, may be applied to one or more of the following communication scenarios: smart home, D2D, V2X, IoT communication scenarios, and the like.

The communication system and the communication scenarios applicable to the present disclosure are merely examples for description. The communication system and the communication scenarios applicable to the present disclosure are not limited thereto. This is uniformly described herein. Details are not described below again.

Figure 6:
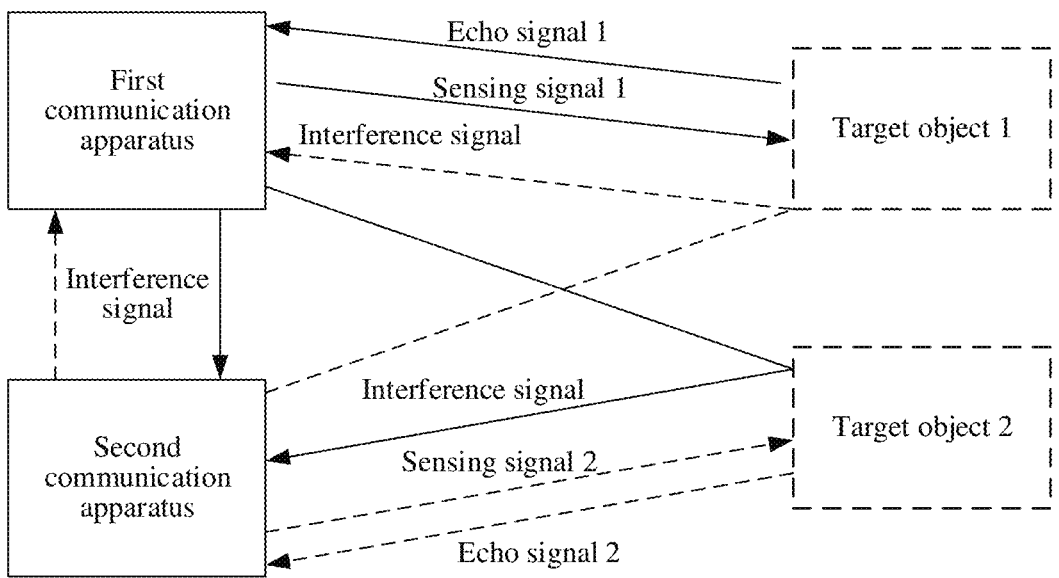
FIG. 6 is a diagram of a structure of an example communication system according to an embodiment of the present disclosure.

FIG. 6 shows an example communication system according to an embodiment of the present disclosure. The communication system includes at least two communication apparatuses. In FIG. 6, an example in which a first communication apparatus and a second communication apparatus are included is used for description. The communication apparatus may send a signal based on a sequence.

Optionally, the communication apparatus may be a radar, or a terminal device or a network device having a radar function. Further, the communication system may further include at least two target objects. In FIG. 6, an example in which a target object 1 and a target object 2 are included is used for description. The signal sent by the communication apparatus may be used to sense the target object.

For example, the first communication apparatus may send a sensing signal 1 to sense the target object 1, and the second communication apparatus may send a sensing signal 2 to sense the target object 2. In this process, the first communication apparatus and the second communication apparatus may interfere with each other.

Interference of one communication apparatus to another communication apparatus mainly includes two parts: one part is interference caused by a direct signal of the communication apparatus, and the other part is interference caused by reflecting a sensing signal by a target object. Therefore, a signal actually received by a communication apparatus is a superposition of an echo signal of the communication apparatus and an interference signal caused by another communication apparatus. In the solution of the present disclosure, interference between the two communication apparatuses is low.

Optionally, for the first communication apparatus and the second communication apparatus in the present disclosure, one of the first communication apparatus and the second communication apparatus may be a terminal device having a radar function, and the other may be a network device having a radar function; or both of the first communication apparatus and the second communication apparatus may be terminal devices having radar functions.

Optionally, the terminal device may be a device having a wireless transceiver function. The network device is a device that connects a terminal device to a wireless network.

The network device may be a next generation NodeB (gNodeB or gNB) in a 5G system or a 6G system, may be a transmission reception point (TRP), may be a base station in a future evolved public land mobile network (PLMN). This is not specifically limited in this embodiment.

The terminal device may also be referred to as UE, a terminal, an access terminal, a subscriber unit, a subscriber station, a mobile station (MS), a remote station, a remote terminal, a mobile terminal (MT), a user terminal, a wireless communication device, a user agent, a user apparatus, or the like. The terminal device may be, for example, an IoT, V2X, D2D, M2M, a 5G network, a 6G network, or a wireless terminal in a future evolved PLMN. The terminal device may be deployed on land, where the deployment includes indoor or outdoor, or handheld or vehicle-mounted deployment, may be deployed on water (for example, on a ship, or the like), or may be deployed in air (for example, on an airplane, a balloon, a satellite, or the like).

For example, the terminal device may be an uncrewed aerial vehicle, an IoT device (for example, a sensor, an electricity meter, a water meter, or the like), a V2X device, a station (ST) in a wireless local area network (WLAN), a cellular phone, a cordless phone, a session initiation protocol (SIP) phone, a wireless local loop (WLL) station, a personal digital processing (PDA) device, a hand-held device having a wireless communication function, a computing device or another processing device connected to a wireless modem, a vehicle-mounted device, a wearable device (which may also be referred to as a wearable intelligent device), a tablet computer or a computer having a wireless transceiver function, a virtual reality (VR) terminal, a terminal in industrial control, a terminal in self-driving, a terminal in remote medical, a terminal in a smart grid, a terminal in transportation safety, a terminal in a smart city, a terminal in a smart home, a vehicle-mounted terminal, a vehicle having a vehicle-to-vehicle (V2V) communication capability, an intelligent networked vehicle, an uncrewed aerial vehicle having an uncrewed aerial vehicle to uncrewed aerial vehicle (UAV to UAV, U2U) communication capability, or the like.

Related functions of the first communication apparatus or the second communication apparatus in the present disclosure may be implemented by one device, may be jointly implemented by a plurality of devices, may be implemented by one or more function modules in one device, may be implemented by one or more chips, or may be implemented by a system on chip (SoC) or a chip system. The chip system may include a chip, or may include a chip and another discrete component. This is not specifically limited in this embodiment.

It may be understood that the foregoing function may be a network element in a hardware device, may be a software function running on dedicated hardware, a combination of hardware and software, or a virtualized function instantiated on a platform (for example, a cloud platform).

Figure 7A:
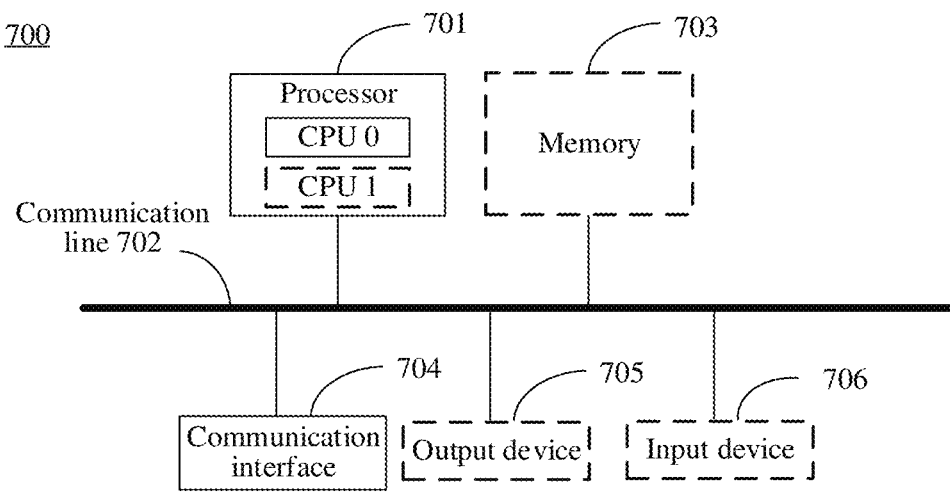
FIG. 7a is a diagram of a structure of an example communication apparatus according to an embodiment of the present disclosure.

For example, the related functions of the first communication apparatus or the second communication apparatus in the present disclosure may be implemented by using a communication apparatus 700 in FIG. 7a. FIG. 7a is a diagram of a structure of an example communication apparatus 700 according to an embodiment of the present disclosure. The communication apparatus 700 includes one or more processors 701 and at least one communication interface (in FIG. 7a, only an example in which the communication interface 704 and one processor 701 are included is used for description), and optionally, may further include a communication line 702 and a memory 703.

The processor 701 may be a general-purpose central processing unit (CPU), a microprocessor, an application-specific integrated circuit (ASIC), or one or more integrated circuits configured to control program execution in the solution of the present disclosure.

During specific implementation, in an embodiment, the processor 701 may include one or more CPUs, for example, a CPU 0 and a CPU 1 in FIG. 7a.

During specific implementation, in an embodiment, the communication apparatus 700 may include a plurality of processors. Each of these processors may be a single-core processor, or may be a multi-core processor. The processor herein may include but is not limited to at least one of the following: various computing devices that run software, such as a central processing unit (CPU), a microprocessor, a digital signal processor (DSP), a microcontroller unit (MCU), an artificial intelligence processor, or the like. Each type of computing device may include one or more cores for executing software instructions to perform an operation or processing.

The communication line 702 may be used for communication between different components included in the communication apparatus 700.

The communication interface 704 may be configured to communicate with another device or communication network, for example, an Ethernet, a radio access network (RAN), a WLAN, or the like. The communication interface 704 may be an apparatus like a transceiver or a transceiver machine, or may be an input/output interface. Alternatively, the communication interface 704 may be a transceiver circuit located inside the processor 701, and is configured to implement signal input and signal output of the processor.

The memory 703 may be an apparatus having a storage function. For example, the memory may be a read-only memory (ROM) or another type of static storage device that can store static information and instructions, a random access memory (RAM) or another type of dynamic storage device that can store information and instructions. The memory may alternatively be an electrically erasable programmable read-only memory (EEPROM), a compact disc read-only memory (CD-ROM) or another compact disk storage, an optical disk storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory is not limited thereto. The memory may independently exist and is connected to the processor through the communication line 702. The memory may alternatively be integrated with the processor.

Optionally, the memory 703 may be configured to store computer-executable instructions for executing the solution of the present disclosure, and the execution is controlled by the processor 701, to implement the method provided in embodiments of the present disclosure.

Alternatively, optionally, in this embodiment, the processor 701 may perform a processing-related function in the method provided in the following embodiment of the present disclosure, and the communication interface 704 is responsible for a function of communicating with another device or communication network in the method provided in the following embodiment of the present disclosure. This is not specifically limited in this embodiment.

Optionally, the computer-executable instructions in this embodiment may also be referred to as application program code. This is not specifically limited in this embodiment.

During specific implementation, in an embodiment, the communication apparatus 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, a projector, or the like. The input device 706 communicates with the processor 701, and may receive an input from a user in a plurality of manners. For example, the input device 706 may be a mouse, a keyboard, a touchscreen device, a sensing device, or the like.

Figure 7B:
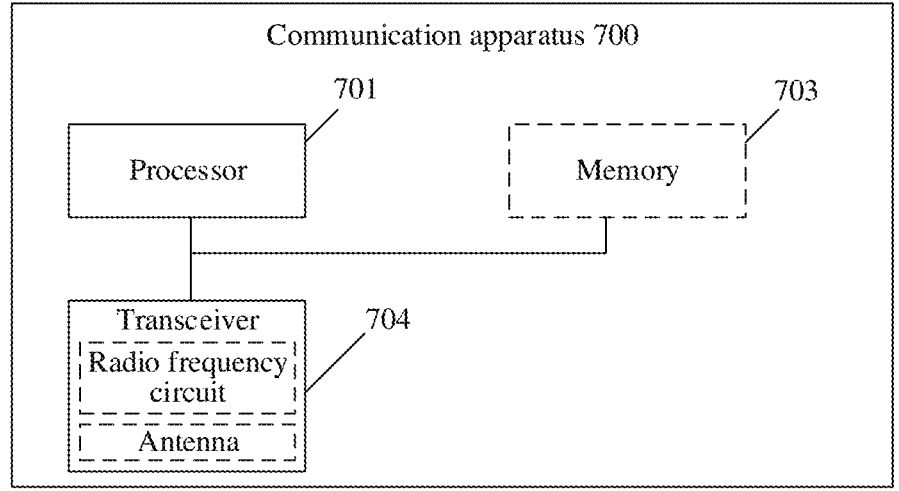
FIG. 7b is a diagram of a structure of another example communication apparatus according to an embodiment of the present disclosure.

An example in which the communication interface 704 is a transceiver is used. FIG. 7*b* is a diagram of a structure of another communication apparatus 700 according to an embodiment of the present disclosure. The communication apparatus 700 includes a processor 701 and a transceiver 704. FIG. 7*b* shows only main parts of the communication apparatus 700. In addition to the processor 701 and the transceiver 704, the communication apparatus may further include a memory 703 and an input/output apparatus (which is not shown in the figure).

The processor 701 is mainly configured to: process a communication protocol and communication data, control the entire communication apparatus, execute a software program, and process data of the software program. The memory 703 is mainly configured to store the software program and data. The transceiver 704 may include a radio frequency circuit and an antenna. The radio frequency circuit is mainly configured to: perform conversion between a baseband signal and a radio frequency signal, and process the radio frequency signal. The antenna is mainly configured to receive and send a radio frequency signal in a form of an electromagnetic wave.

After the communication apparatus is powered on, the processor 701 may read the software program in the memory 703, interpret and execute instructions of the software program, and process the data of the software program. When needing to send data wirelessly, after performing baseband processing on the to-be-sent data, the processor 701 outputs a baseband signal to the radio frequency circuit; and the radio frequency circuit performs radio frequency processing on the baseband signal and then sends a radio frequency signal to the outside in a form of an electromagnetic wave through the antenna. When data is sent to the communication apparatus, the radio frequency circuit receives a radio frequency signal through the antenna, converts the radio frequency signal into a baseband signal, and outputs the baseband signal to the processor 701. The processor 701 converts the baseband signal into data, and processes the data.

In another implementation, the radio frequency circuit and the antenna may be disposed independent of the processor that performs baseband processing. For example, in a distributed scenario, the radio frequency circuit and the antenna may be remotely disposed independent of the communication apparatus.

Figure 7C:
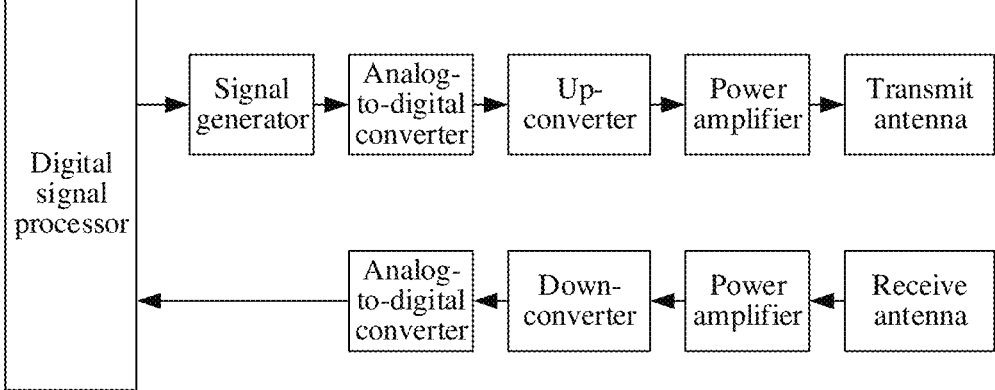
FIG. 7c is a diagram of a structure of still another example communication apparatus according to an embodiment of the present disclosure.

For example, as shown in FIG. 7*c*, the processor 701 in FIG. 7*b* may include a digital signal processor, a signal generator, and an analog-to-digital converter. A radio frequency circuit configured to send a signal may include an up-converter and a power amplifier, and a radio frequency circuit configured to receive a signal may include a down-converter and a power amplifier. The antenna may include a transmit antenna and a receive antenna.

In a possible implementation, the signal generator may be configured to generate a signal. The up-converter and the down-converter are respectively configured to modulate a signal to a high-frequency carrier and demodulate a signal from the high-frequency carrier. The power amplifier is configured to amplify power of a signal. The analog-to-digital converter is configured to convert a digital signal and an analog signal. The digital signal processor is configured to generate a sensing sequence and perform an auto correlation operation and/or a cross-correlation operation.

It should be noted that the composition structure shown in FIG. 7a, FIG. 7b, or FIG. 7c does not constitute any limitation on the communication apparatus. In addition to the parts shown in FIG. 7a, FIG. 7b, or FIG. 7c, the communication apparatus may include more or fewer parts than those shown in the figure, a combination of some parts, or a different arrangement of the parts. The parts shown in the figure may be implemented by hardware, software, or a combination of software and hardware.

With reference to the accompanying drawings, the following describes the method provided in the present disclosure. In embodiments of the present disclosure, an execution body may perform a part or all of the steps in embodiments of the present disclosure. The steps or operations are merely examples. Other operations or variations of various operations may alternatively be performed in embodiments of the present disclosure. In addition, the steps may be performed in a sequence different from a sequence presented in embodiments of the present disclosure, and not all the operations in embodiments of the present disclosure may be performed.

Figure 8:
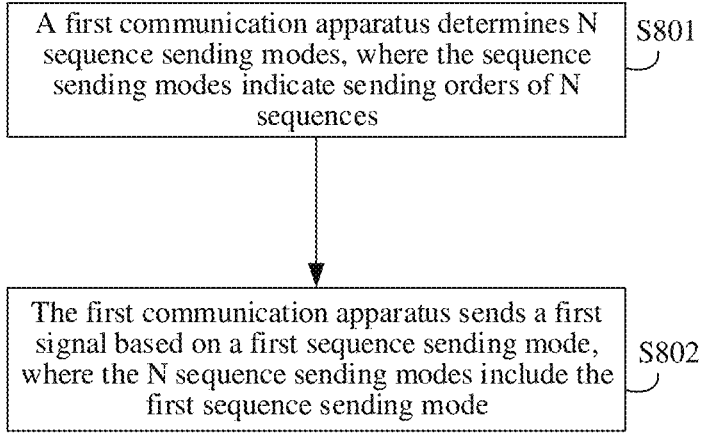
FIG. 8 is a schematic flowchart of an example signal sending method according to an embodiment of the present disclosure.

FIG. 8 shows an example signal sending method according to the present disclosure. Refer to FIG. 8. The signal sending method includes the following steps.

S801: A first communication apparatus determines N sequence sending modes, where N is a positive integer greater than 1.

The sequence sending modes indicate sending orders of N sequences. In other words, each sequence sending mode indicates one sending order of the N sequences. Different sequence sending modes indicate different sending orders of the N sequences.

In example embodiments the present disclosure, a sending order of the N sequences indicated by a sequence sending mode may also be understood as an arrangement order of the N sequences. The sending order and the arrangement order may be replaced with each other.

The N sequences are sent by the first communication apparatus in N periods. For example, the first communication apparatus may send an $n^{th}$ sequence indicated by a sequence sending mode in an $n^{th}$ period, where n=0, 1 . . . . N−1.

In the N sequence sending modes, a cyclic shift value between sending orders indicated by any two adjacent sequence sending modes is 1. In other words, in any adjacent sequence sending modes, a sending order indicated by one sequence sending mode is cyclically shifted by one bit to obtain a sending order indicated by the other sequence sending mode.

For example, numbers of the N sequences are respectively 1,2,3, . . . ,N. A sending order indicated by a $1^{st}$ sequence sending mode in the N sequence sending modes may be: 1,2,3, . . . , N. In other words, the sequence 1, the sequence 2, the sequence 3, . . . , and the sequence N are sequentially sent in the N periods. A sending order indicated by a $2^{nd}$ sequence sending mode in the N sequence sending modes may be 2,3, . . . , N, 1. In other words, the sequence 2, the sequence 3, . . . , the sequence N, and the sequence 1 are sequentially sent in the N periods. A sending order indicated by a $3^{rd}$ sequence sending mode in the N sequence sending modes may be 3, . . . , N, 1,2. In other words, the sequence 3, the sequence 4, . . . , the sequence N, the sequence 1, and the sequence 2 are sequentially sent in the N periods. By analogy, the sending orders indicated by the N sequence sending modes are respectively as follows:

a sequence sending mode 1: 1,2,3,4, . . . ,N−2,N−1,N;

a sequence sending mode 2: 2,3,4, . . . ,N−2,N−1,N,1;

a sequence sending mode 3: 3,4, . . . ,N−2,N−1,N,1,2;

a sequence sending mode N−2: N−2,N−1,N,1,2, . . . , N−5,N−4,N−3;

a sequence sending mode N−1: N−1,N,1,2, . . . ,N−4,N−3,N−2; and a sequence sending mode N: N,1,2,3, . . . ,N−3,N−2,N−1.

In the foregoing example, the sending order indicated by the sequence sending mode 1 is cyclically shifted leftward by one bit to obtain the sending order indicated by the sequence sending mode 2, and the sending order indicated by the sequence sending mode 2 is cyclically shifted rightward by one bit to obtain the sending order indicated by the sequence sending mode 1. In addition, the sending order indicated by the sequence sending mode 2 is cyclically shifted leftward by one bit to obtain the sending order indicated by the sequence sending mode 3, and the sending order indicated by the sequence sending mode 1 is cyclically shifted leftward by two bits to obtain the sending order indicated by the sequence sending mode 3.

Optionally, in the N sequence sending modes, a cyclic shift value between any two sequence sending modes may also be understood as a distance between the any two sequence sending modes, that is, the distance between the any two sequence sending modes is defined as a cyclic shift value between sending orders indicated by the any two sequence sending modes. Therefore, the cyclic shift value and the distance in example embodiments of the present disclosure may be replaced with each other. For example, in the foregoing example, a cyclic shift value between the sequence sending mode 1 and the sequence sending mode 2 is 1, and therefore a distance between the sequence sending mode 1 and the sequence sending mode 2 is 1; and a cyclic shift value between the sequence sending mode 1 and the sequence sending mode 3 is 2, and therefore a distance between the sequence sending mode 1 and the sequence sending mode 3 is 2.

It should be noted that the sending order indicated by the sequence sending mode 1 is cyclically shifted rightward by one bit to obtain the sending order indicated by the sequence sending mode N, and is cyclically shifted rightward by two bits to obtain the sending order indicated by the sequence sending mode N−1. Therefore, when N is an even number, a largest cyclic shift value (or a largest distance) between sequence sending modes is equal to N/2

For example, N is equal to 10. For the N sequence sending modes shown above, cyclic shift values (or distances) between the sequence sending modes may be shown in Table 1.

TABLE 1

| Sequence sending mode | 1 | 2 | 3 | 4 | 5 | 6 | 7 | 8 | 9 | 10 |
|---|---|---|---|---|---|---|---|---|---|---|
| 1 | 0 | 1 | 2 | 3 | 4 | 5 | 4 | 3 | 2 | 1 |
| 2 | 1 | 0 | 1 | 2 | 3 | 4 | 5 | 4 | 3 | 2 |
| 3 | 2 | 1 | 0 | 1 | 2 | 3 | 4 | 5 | 4 | 3 |
| 4 | 3 | 2 | 1 | 0 | 1 | 2 | 3 | 4 | 5 | 4 |
| 5 | 4 | 3 | 2 | 1 | 0 | 1 | 2 | 3 | 4 | 5 |
| 6 | 5 | 4 | 3 | 2 | 1 | 0 | 1 | 2 | 3 | 4 |
| 7 | 4 | 5 | 4 | 3 | 2 | 1 | 0 | 1 | 2 | 3 |
| 8 | 3 | 4 | 5 | 4 | 3 | 2 | 1 | 0 | 1 | 2 |
| 9 | 2 | 3 | 4 | 5 | 4 | 3 | 2 | 1 | 0 | 1 |
| 10 | 1 | 2 | 3 | 4 | 5 | 4 | 3 | 2 | 1 | 0 |

Optionally, the N sequences may include one of an M sequence, a Gold sequence, a GCP sequence, or an Ipatov sequence. Certainly, the N sequences may alternatively be sequences of another type. A type of the N sequences is not specifically limited in the present disclosure.

It should be noted that different sequences in the foregoing N sequences are of a same type. For example, the N sequences may be N M sequences, N Gold sequences, N (pairs of) GCP sequences, or N Ipatov sequences.

Optionally, one sequence in an example embodiment of the present disclosure may mean one sequence. For example, one sequence may mean one M sequence, or may mean one Gold sequence. Alternatively, one sequence in another example embodiment of the present disclosure may mean a plurality of sequences used as a whole. For example, one sequence may mean two sequences included in a GCP sequence, or may mean another sequence that includes a plurality of sequences used as a whole.

Optionally, the N sequences may be all sequences of a type defined in a protocol. For example, 10 M sequences are defined in a standard, and therefore the N sequences are the 10 M sequences defined in the standard.

Alternatively, the N sequences may be some of sequences of a type defined in a protocol. For example, 10 M sequences are defined in a standard, and therefore the N sequences may be some of the 10 M sequences defined in the standard and supported by the first communication apparatus.

Optionally, the N sequence sending modes may be defined in a protocol. In this case, the N sequence sending modes may be pre-stored in the first communication apparatus. That a first communication apparatus determines N sequence sending modes may be understood as that the first communication apparatus reads the N sequence sending modes stored in the first communication apparatus.

Alternatively, the N sequence sending modes may be determined by the first communication apparatus. For example, it is assumed that the first communication apparatus stores the N sequences. In this case, the first communication apparatus may determine the N sequence sending modes based on the N sequences.

S802: The first communication apparatus sends a first signal based on a first sequence sending mode.

The N sequence sending modes include the first sequence sending mode.

Optionally, the first sequence sending mode may be any sequence sending mode in the N sequence sending modes. Alternatively, the first sequence sending mode may be determined based on K second sequence sending modes and the N sequence sending modes. K is a positive integer. The second sequence sending mode is a sequence sending mode corresponding to a second communication apparatus. For example, the second communication apparatus may be any communication apparatus other than the first communication apparatus.

In a possible implementation, before step S802, the first communication apparatus may receive a sequence sent by the second communication apparatus. For example, the first communication apparatus may monitor, based on a first period in a sending duration of one sequence, a sequence sent by the second communication apparatus. The sending duration of one sequence may be understood as a duration of monitoring once. The first period may be understood as an interval between two adjacent times of monitoring. The first period is greater than or equal to a sending duration of the first signal. In other words, the first period is greater than or equal to a sending duration (or a sending period) of the N sequences. In other words, it is assumed that the sending duration of each sequence in the N sequences is $T_1$, and the first period is $T_2$. In this case, $T_2 \geq NT$.

Figure 9:
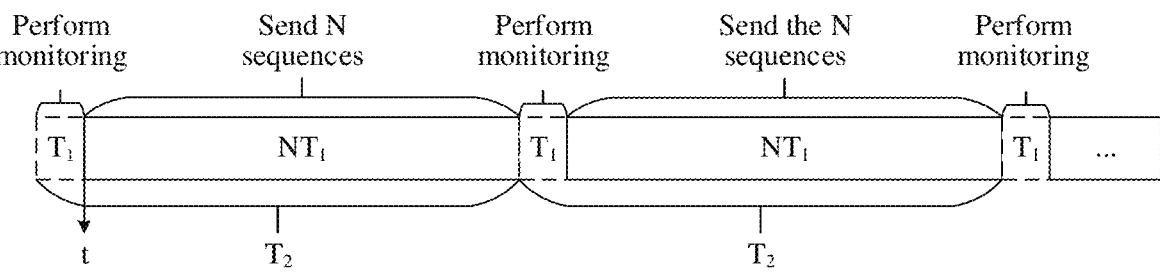
FIG. 9 is a diagram of an example monitoring period according to an embodiment of the present disclosure.

For example, as shown in FIG. 9, before a moment t, the first communication apparatus performs monitoring in $T_1$ duration, and then may send the foregoing N sequences. Then, monitoring may continue to be performed in the $T_1$ duration. After the monitoring ends, the N sequences continue to be sent, and the rest may be deduced by analogy until the first communication apparatus does not need to send a sequence.

For example, that the first communication apparatus performs monitoring may include: The first communication apparatus receives an interference signal in one $T_1$, and uses the interference signal to separately perform an auto correlation operation on the foregoing N sequences. If no auto correlation peak appears, it indicates that a sequence sent by the second communication apparatus is not detected, in other words, it indicates that the second communication apparatus does not send a sequence. If an auto correlation peak appears, it indicates that a sequence sent by the second communication apparatus is detected, in other words, it indicates that the second communication apparatus sends a sequence. The first communication apparatus may determine, based on the auto correlation peak, the sequence sent by the second communication apparatus. In the present disclosure, an example in which the sequence sent by the second communication apparatus is a first sequence, that is, the first communication apparatus detects the first sequence in the first period is used for description. The first sequence is one of the N sequences.

If the first communication apparatus does not detect, in a sending duration of one sequence, the sequence sent by the second communication apparatus, the first communication apparatus may select, from the N sequence sending modes, any sequence sending mode as the first sequence sending mode. For example, as shown in FIG. 9, it is assumed that the first communication apparatus does not detect, in $1^{st}$ $T_1$, a sequence sent by the second communication apparatus. In this case, the first communication apparatus may send the N sequences in an order indicated by any sequence sending mode.

If the first communication apparatus monitors, in a sending duration of one sequence, first sequences sent by K second communication apparatuses, the first communication apparatus may determine K second sequence sending modes based on the monitored K first sequences, and determine the first sequence sending mode based on the K second sequence sending modes and the foregoing N sequence sending modes. For example, the first communication apparatus may determine a sequence sending mode indicating that a $1^{st}$ sequence is the first sequence as a second sequence sending mode. In other words, a $1^{st}$ sequence indicated by the second sequence sending mode is the first sequence. For example, K is equal to 1. It is assumed that the first sequence detected by the first communication apparatus is the sequence 2. In this case, a corresponding second sequence sending mode may be the foregoing sequence sending mode 2.

Figure 10A:
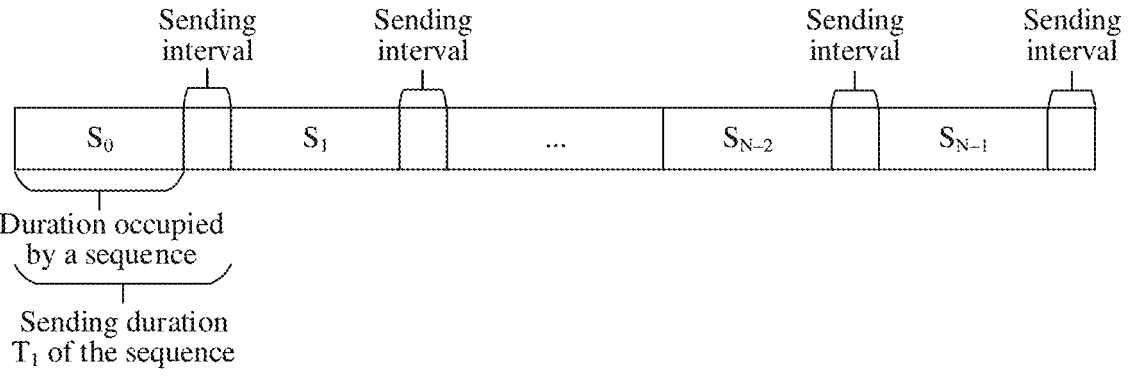
FIG. 10a is a diagram of a sending duration of an example sequence according to an embodiment of the present disclosure.
Figure 10B:
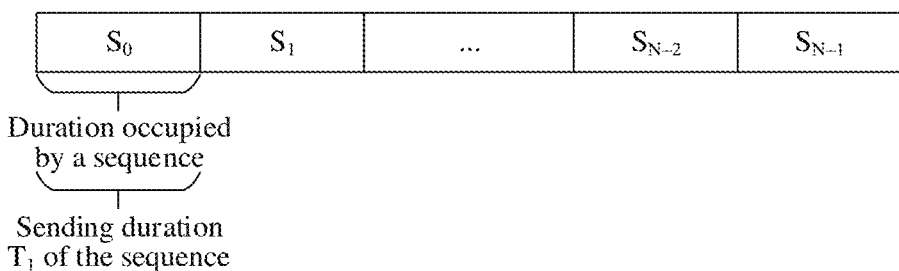
FIG. 10b is a diagram of a sending duration of another example sequence according to an embodiment of the present disclosure.

Optionally, there may be a sending interval or no sending interval between the N sequences. For example, as shown in FIG. 10a, an example in which S, represents an $n^{th}$ sequence in N sequences, and n=0.1 . . . . N−1 is used. When there is a sending interval, a sending duration $T_1$ of one sequence includes a duration occupied by the sequence and the sending interval. As shown in FIG. 10b, when there is no sending interval, a sending duration $T_1$ of one sequence is equal to a duration occupied by the sequence.

Optionally, the second sequence sending mode may be a sequence sending mode used by the second communication apparatus. Alternatively, the second sequence sending mode may be a sequence sending mode obtained by performing cyclic shift on a sequence sending mode used by the second communication apparatus. For example, when the first sequence is a $1^{st}$ sequence indicated by the sequence sending mode used by the second communication apparatus, the second sequence sending mode is the sequence sending mode used by the second communication apparatus; or when the first sequence is not a $1^{st}$ sequence indicated by the sequence sending mode used by the second communication apparatus, the second sequence sending mode is the sequence sending mode obtained by performing cyclic shift on the sequence sending mode used by the second communication apparatus.

It may be understood that, regardless of whether the second sequence sending mode is the sequence sending mode used by the second communication apparatus, a transmission delay exists between the second communication apparatus and the first communication apparatus, and a sequence causing interference to the first communication apparatus is a sequence that is sent by the second communication apparatus and that is detected by the first communication apparatus after the delay. A delay exists between sending the first sequence by the second communication apparatus and detecting the first sequence by the first communication apparatus, and the sequence after the delay is the sequence causing the interference to the first communication apparatus. Therefore, the sequence that is sent by the second communication apparatus and that causes the interference to the first communication apparatus complies with the second sequence sending mode. In this way, the first communication apparatus determines the first sequence sending mode based on the second sequence sending mode, so that interference caused by the second communication apparatus to the first communication apparatus can be reduced.

In a possible implementation, when K is equal to 1, the first sequence sending mode may be a sequence sending mode having a largest cyclic shift value (or distance) with the one second sequence sending mode in the N sequence sending modes.

For example, N is equal to 10, and cyclic shift values between 10 sequence sending modes are shown in Table 1. It is assumed that the second sequence sending mode is the sequence sending mode 2. In this case, a sequence sending mode having a largest cyclic shift value with the sequence sending mode 2 is the sequence sending mode 7. Therefore, the first sequence sending mode is the sequence sending mode 7.

In another possible implementation, when K is greater than 1, the first sequence sending mode may be a sequence sending mode in the N sequence sending modes, where a sum of cyclic shift values (or distances) between the sequence sending mode and the K second sequence sending modes is the largest.

For example, N is equal to 10, cyclic shift values between 10 sequence sending modes are shown in Table 1, and K is equal to 2. It is assumed that the K second sequence sending modes are the sequence sending mode 2 and the sequence sending mode 3.

In this case, for the sequence sending mode 1, a cyclic shift value between the sequence sending mode 1 and the sequence sending mode 2 is 1, and a cyclic shift value between the sequence sending mode 1 and the sequence sending mode 3 is 2. Therefore, a sum of the cyclic shift values is 3.

For the sequence sending mode 4, a cyclic shift value between the sequence sending mode 4 and the sequence sending mode 2 is 1, and a cyclic shift value between the sequence sending mode 4 and the sequence sending mode 3 is 1. Therefore, a sum of cyclic shift values is 3.

For the sequence sending mode 5, a cyclic shift value between the sequence sending mode 5 and the sequence sending mode 2 is 3, and a cyclic shift value between the sequence sending mode 5 and the sequence sending mode 3 is 2. Therefore, a sum of cyclic shift values is 5.

For the sequence sending mode 6, a cyclic shift value between the sequence sending mode 6 and the sequence sending mode 2 is 4, and a cyclic shift value between the sequence sending mode 6 and the sequence sending mode 3 is 3. Therefore, a sum of cyclic shift values is 7.

For the sequence sending mode 7, a cyclic shift value between the sequence sending mode 7 and the sequence sending mode 2 is 5, and a cyclic shift value between the sequence sending mode 7 and the sequence sending mode 3 is 4. Therefore, a sum of cyclic shift values is 9.

For the sequence sending mode 8, a cyclic shift value between the sequence sending mode 8 and the sequence sending mode 2 is 4, and a cyclic shift value between the sequence sending mode 8 and the sequence sending mode 3 is 5. Therefore, a sum of cyclic shift values is 9.

For the sequence sending mode 9, a cyclic shift value between the sequence sending mode 9 and the sequence sending mode 2 is 3, and a cyclic shift value between the sequence sending mode 9 and the sequence sending mode 3 is 4. Therefore, a sum of cyclic shift values is 7.

For the sequence sending mode 10, a cyclic shift value between the sequence sending mode 10 and the sequence sending mode 2 is 2, and a cyclic shift value between the sequence sending mode 10 and the sequence sending mode 3 is 3. Therefore, a sum of cyclic shift values is 5.

The cyclic shift values between the sequence sending mode 7 and the two second sequence sending modes are the largest, and the cyclic shift values between the sequence sending mode 8 and the two second sequence sending modes are the largest. Therefore, the first sequence sending mode may be one of the sequence sending mode 7 and the sequence sending mode 8.

In still another possible implementation, when K is greater than 1, the first sequence sending mode is a sequence sending mode having a largest cyclic shift value between the sequence sending mode and a target second sequence sending mode in the N sequence sending modes. The target second sequence sending mode is a sequence sending mode whose corresponding interference power is the strongest in the K second sequence sending modes. For example, interference power corresponding to the second sequence sending mode may be received signal strength or received signal power of the first sequence.

For example, N is equal to 10, cyclic shift values between 10 sequence sending modes are shown in Table 1, and K is equal to 2. It is assumed that K second sequence sending modes are the sequence sending mode 2 and the sequence sending mode 3, and interference power corresponding to the sequence sending mode 3 is greater than interference power corresponding to the sequence sending mode 2. In this case, the target second sequence sending mode is the sequence sending mode 3. The first sequence sending mode is a sequence sending mode having a largest cyclic shift value between the sequence sending mode and the sequence sending mode 3 in the N sequence sending modes. In other words, the first sequence sending mode is the sequence sending mode 8.

Optionally, the first signal may be used for sensing. For example, the first signal may be a signal used for radar ranging, or the first signal may be a signal used for sensing a distance.

For example, in a 5G or 6G mobile communication system, the first signal may be one of a synchronization signal (SS), an SRS, a random access (RA) signal, a channel state information reference signal (CSI-RS), a demodulation reference signal (DMRS), or a positioning reference signal (PRS); or the first signal may be a reference signal dedicated to sensing. In an UWB, the first signal may be a preamble signal.

Optionally, the first signal may include sub-signals in the N periods. A sub-signal in an $n^{th}$ period is generated by using an $n^{th}$ sequence indicated by the first sequence sending mode, and n=0.1 . . . . N−1.

For example, the first sequence sending mode is the sequence sending mode 3. A 0th sequence indicated by the sequence sending mode 3 is a sequence 3, a $1^{st}$ sequence indicated by the sequence sending mode 3 is a sequence 4, a $2^{nd}$ sequence indicated by the sequence sending mode 3 is a sequence 5, . . . , an $(N−3)^{th}$ sequence indicated by the sequence sending mode 3 is a sequence N, an $(N−2)^{th}$ sequence indicated by the sequence sending mode 3 is a sequence 1, and an $(N−1)^{th}$ sequence indicated by the sequence sending mode 3 is a sequence 2. Therefore, a sub-signal in a oth period included in the first signal is generated by using the sequence 3, a sub-signal in a $1^{st}$ period included in the first signal is generated by the sequence 4, a sub-signal in a $2^{nd}$ period included in the first signal is generated by using the sequence 5, . . . , a sub-signal in an $(N−3)^{th}$ period included in the first signal is generated by using the sequence N, a sub-signal in an $(N−2)^{th}$ period included in the first signal is generated by using the sequence 1, and a sub-signal in an $(N−1)^{th}$ period included in the first signal is generated by using the sequence 2.

In a possible implementation, the N sequences may be first-type sequences. The first-type sequence may be a sequence having a perfect periodic auto correlation property, or may be a sequence having a good periodic auto correlation property. In this case, the $n^{th}$ sequence indicated by the first sequence sending mode may include P repeated first-type sequences, in other words, the sub-signal in the $n^{th}$ period is generated by repeating the $n^{th}$ sequence (which is a first-type sequence) indicated by the first sequence sending mode for P times. Further, there may be no sending interval between the P repeated first-type sequences. In other words, the $n^{th}$ sequence indicated by the first sequence sending mode may be repeatedly sent without an interval. P is a positive integer greater than 1.

For example, the first sequence sending mode is the sequence sending mode 3, and the N sequences are first-type sequences. It is assumed that the sequence 1 is represented as $S_1$, the sequence 2 is represented as S, . . . , and the sequence N is represented as $S_N$. In this case, a sequence carried by the first signal may be shown in FIG. 11a.

When a correlation operation is performed on the first signal and an echo signal of the first signal, and the $n^{th}$ sequence indicated by the first sequence sending mode is repeatedly sent without an interval, the correlation operation performed on the first signal and the echo signal of the first signal may be a periodic auto correlation operation, so that the perfect or good periodic auto correlation property of the first-type sequence is properly used. This improves sensing performance.

Figure 11A:
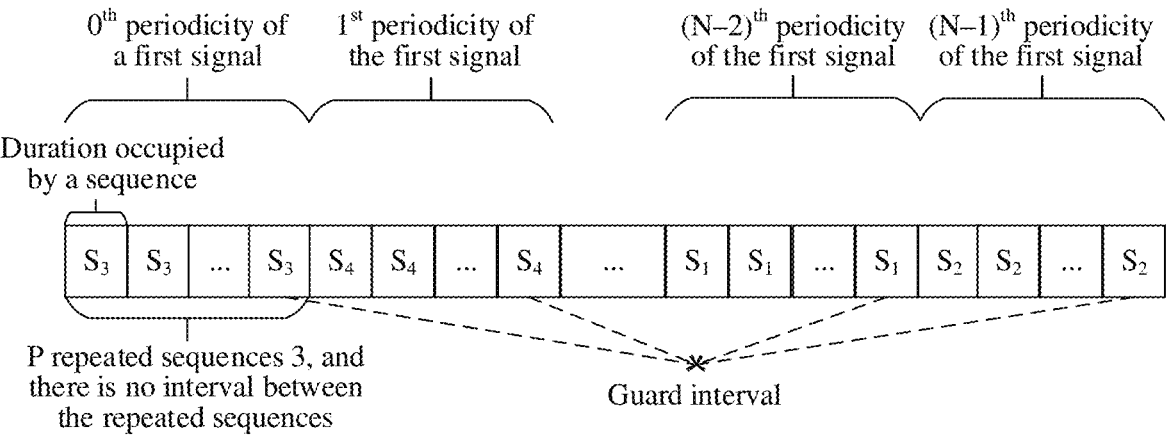
FIG. 11a is an example diagram of repeatedly sending a sequence according to an embodiment of the present disclosure.

In addition, when the periodic auto correlation operation is performed on the first signal and the echo signal of the first signal, last repeated sending of the sequence n may be used as a guard interval, and does not participate in the periodic auto correlation operation, to reduce interference. For example, as shown in FIG. 11a, a last S3, a last S, a last $S_1$, and a last S, are used as guard intervals.

In another possible implementation, the N sequences may be second-type sequences. The second-type sequence may be a sequence having a perfect aperiodic auto correlation property, or may be a sequence having a good aperiodic auto correlation property. In this case, the $n^{th}$ sequence indicated by the first sequence sending mode may include P repeated second-type sequences, in other words, the sub-signal in the $n^{th}$ period is generated by repeating the $n^{th}$ sequence (which is a second-type sequence) indicated by the first sequence sending mode for P times. Further, there is a sending interval between the P repeated second-type sequences, and the sending interval is greater than or equal to a duration occupied for sending the second-type sequence. P is a positive integer greater than 1.

Figure 11B:
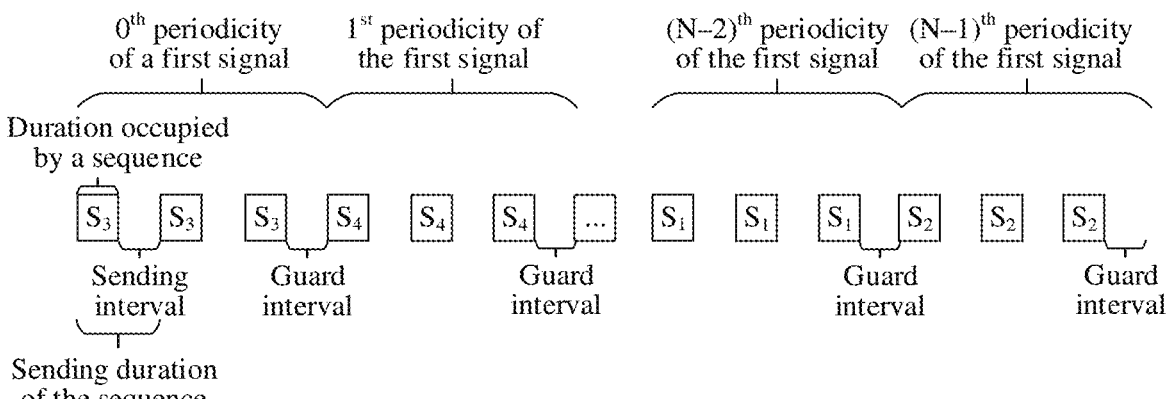
FIG. 11b is an example diagram of repeatedly sending another sequence according to an embodiment of the present disclosure.

For example, the first sequence sending mode is the sequence sending mode 3, the N sequences are second-type sequences, and P is equal to 3. It is assumed that the sequence 1 is represented as $S_1$, the sequence 2 is represented as $S_2$, . . . , and the sequence N is represented as $S_N$. A sequence carried by the first signal may be shown in FIG. 11b.

Optionally, when there is a sending interval between the P repeated second-type sequences, a sending interval between different sequences may be used as a guard interval, to reduce interference between sequences.

When a correlation operation is performed on the first signal and an echo signal of the first signal, and there is a sending interval between the P repeated $n^{th}$ sequences, the correlation operation performed on the first signal and the echo signal of the first signal may be an aperiodic auto correlation operation, so that the perfect or good aperiodic auto correlation property of the first-type sequence is properly used. This improves sensing performance.

Optionally, when the sub-signal in the $n^{th}$ period is generated by repeating the $n^{th}$ sequence indicated by the first sequence sending mode for P times, the sending duration of the first signal may be NT, P, and the first period $T_2$ may meet $T_2 \geq NT_1 P$. $T_1$ represents a sending duration of one sequence. FIG. 10a and FIG. 10b may be understood as examples in a case in which the $n^{th}$ sequence is not repeated (that is, P is equal to 1).

Optionally, the first signal may be a single-carrier signal, and the first communication apparatus may generate the first signal based on the first sequence sending mode in a phase modulation manner. Certainly, the first signal may alternatively be a multi-carrier signal. This is not specifically limited in the present disclosure.

Based on the foregoing solution, the first communication apparatus sends the first signal based on the first sequence sending mode in the N sequence sending modes. Because the sequence sending modes may indicate the sending orders of the N sequences, the sending of the first signal based on the first sequence sending mode may enable the first signal to carry (or include) N different sequences. When the N sequences are not perfect auto correlation sequences, a ratio of an auto correlation side lobe to an auto correlation peak may be reduced. In this way, sensing accuracy is improved. When the N sequences have poor cross-correlation, a ratio of a cross-correlation result to the auto correlation peak can be reduced. In this way, interference between different communication apparatuses is reduced.

In addition, the first sequence sending mode may be determined based on at least one second sequence sending mode corresponding to the second communication apparatus, so that different communication apparatuses may use different sequences in a same period. In this way, the interference between the different communication apparatuses is further reduced.

In other words, according to the solution provided in the present disclosure, sensing performance can be improved by improving the sensing accuracy or reducing the interference between the different communication apparatuses.

In some implementation scenarios, as shown in FIG. 12, after step S802, the signal sending method further includes the following steps S803 to S805.

S803: The first communication apparatus receives the echo signal of the first signal.

Optionally, after the first communication apparatus starts to send the first signal, a receive antenna starts to receive the echo signal of the first signal in an omnidirectional or directional manner.

Optionally, an antenna used by the first communication apparatus to send the first signal and an antenna used by the first communication apparatus to receive the echo signal of the first signal may be the same or different. When the antenna used by the first communication apparatus to send the first signal and the antenna used by the first communication apparatus to receive the echo signal of the first signal are the same, it may be considered that the first communication apparatus works in a full-duplex manner.

S804: The first communication apparatus performs an auto correlation operation based on the echo signal and the first signal.

Optionally, the first communication apparatus may separately perform a sub-correlation operation on the echo signal and the first signal for the N periods, to obtain N auto correlation results, and accumulate the N auto correlation results to obtain a final auto correlation operation result. In other words, an auto correlation operation result obtained by performing step S804 is a result obtained by accumulating the N periodic auto correlation results.

S805: The first communication apparatus determines a distance between the first communication apparatus and a target object based on the auto correlation operation result.

Optionally, the first communication apparatus may determine a signal propagation delay between the first communication apparatus and the target object based on a shift corresponding to a maximum auto correlation peak of the auto correlation operation result obtained by performing step S804. Then, the distance between the first communication apparatus and the target object is determined based on the signal transmission delay. For example, the first signal is a single-carrier signal. It is assumed that the shift corresponding to the maximum auto correlation peak is 1. In this case, the delay is $1T_C$, and the distance between the target object and the first communication apparatus is $c1T_C/2$. c is a speed of light. Tc indicates a pulse duration.

Optionally, in a non-ideal channel condition, the echo signal may be accompanied by a noise signal. In other words, signals received by the first communication apparatus in step S803 may include the noise signal and the echo signal of the first signal. In this case, the first communication apparatus may perform the foregoing step S804 by using the signals received in step S803 as a whole.

The foregoing describes the solution of the present disclosure. An example in which the solution of the present disclosure is separately applied to an M sequence, an Ipatov sequence, a GCP sequence, and a Gold sequence is used below to describe a cross-correlation status between sequences and an auto correlation status of a sequence during application of the solution of the present disclosure.

In some embodiments, the solution of the present disclosure may be applied to an M sequence. In other words, the N sequences may be M sequences. An M sequence whose length is 127 is used as an example. Currently, there are a total of 18 M sequences whose lengths are 127. In other words, N is equal to 18. Based on the solution of the present disclosure, the 18 sequence sending modes may be defined as follows:

a sequence sending mode 1: 1,2,3,4, . . . ,16,17,18;

a sequence sending mode 2: 2,3,4,5, . . . ,17,18,1;

a sequence sending mode 3: 3,4,5,6, . . . ,18,1,2;

a sequence sending mode 16: 16,17,18,1, . . . ,13,14,15;

a sequence sending mode 17: 17,18,1,2, . . . ,14,15,16; and a sequence sending mode 18: 18,1,2,3, . . . ,15,16,17

For the foregoing 18 sequence sending modes, a periodic cross-correlation result between every two sequence sending modes may be calculated, to indicate interference between different communication apparatuses. For example, a periodic cross-correlation result between the sequence sending mode 1 and the sequence sending mode 2 is a sum of a periodic cross-correlation result of an $n^{th}$ M sequence indicated by the sequence sending mode 1 and an $n^{th}$ M sequence indicated by the sequence sending mode 2, where n=0,1, . . . 17. In other words, the periodic cross-correlation result between the sequence sending mode 1 and the sequence sending mode 2 is an accumulated value of the following 18 periodic cross-correlation results: a periodic cross-correlation result of an M sequence 1 and an M sequence 2, a periodic cross-correlation result of the M sequence 2 and an M sequence 3, a periodic cross-correlation result of the M sequence 3 and an M sequence 4, . . . , a periodic cross-correlation result of an M sequence 16 and an M sequence 17, a periodic cross-correlation result of the M sequence 17 and an M sequence 18, and a periodic cross-correlation result of the M sequence 18 and the M sequence 1.

Optionally, the periodic cross-correlation result may be a relative value in a unit of a decibel (dB). For example, a periodic cross-correlation result between two sequences may be equal to:

$$20 \times \log_{10} \left( \frac{\text{periodic cross-correlation peak}}{\text{periodic auto correlation peak}} \right)$$

For example, the periodic cross-correlation result of the M sequence 1 and the M sequence 2 is equal to:

$$20 \times \log_{10} \left( \frac{\text{periodic cross-correlation peak of the } M \text{ sequence 1 and the } M \text{ sequence 2}}{\text{periodic auto correlation peak of the } M \text{ sequence}} \right)$$

It should be noted that, for M sequences whose lengths are the same, different M sequences have a same periodic auto correlation peak. For example, in the 18 M sequences whose lengths are 127, periodic auto correlation peaks of the M sequences are the same.

It is assumed that the foregoing 18 M sequences whose lengths are 127 are applied to a conventional solution. In this case, for a communication apparatus, the communication apparatus may repeatedly send one of the 18 M sequences in different periods. In this case, interference between different communication apparatuses is determined based on periodic cross-correlation results of M sequences sent by the different communication apparatuses. Therefore, for the 18 M sequences whose lengths are 127, a periodic cross-correlation result between every two M sequences may be calculated, to indicate interference between different communication apparatuses. For calculation of the periodic cross-correlation result between two sequences, refer to the foregoing related descriptions.

It is assumed that the foregoing 18 M sequences whose lengths are 127 are applied to a sequence sending solution based on an NR protocol in a sensing scenario. In a case of initializing Cm=1,2,3 . . . ,18, 18 sequence sending modes may alternatively be obtained in the foregoing calculation manner of f (n),n, =0,1,2, . . . ,17. For the 18 sequence sending modes in this scenario, a periodic cross-correlation result between every two sequence sending modes may alternatively be calculated, to indicate interference between different communication apparatuses. For example, the following shows three of the 18 sequence sending modes obtained based on the NR protocol, and the other sequence sending modes are not shown.

A sequence sending mode 1 is 10, 16, 0, 4, 2, 7, 12, 16, 0, 4, 6, 17, 1, 0, 2, 10, 6, 3.

A sequence sending mode 2 is 11, 17, 1, 5, 3, 8, 13, 17, 1, 5, 7, 0, 13, 1, 3, 11, 7, 4.

A sequence sending mode 3 is 10, 10, 11, 10, 5, 13, 8, 2, 11, 10, 5, 4, 17, 2, 7, 15, 12, 6.

For example, Table 2 shows a maximum value, a minimum value, and an average value of a periodic cross-correlation result in a case in which the M sequence whose length is 127 is separately applied to the solution of the present disclosure, the conventional solution, and the sequence sending solution based on the NR protocol.

TABLE 2

| Solution | Maximum value of the periodic cross-correlation result | Minimum value of the periodic cross-correlation result | Average value of the periodic cross-correlation result |
|---|---|---|---|
| Solution of the present disclosure | −19.80 dB | −25.45 dB | −22.50 dB |
| Sequence sending solution based on the NR protocol | −11.19 dB | −24.90 dB | −18.60 dB |
| Conventional solution | −9.82 dB | −17.47 dB | −14.66 dB |

It may be understood that a larger value of the periodic cross-correlation result may indicate greater interference between different communication apparatuses. Therefore, it can be learned from Table 2 that, for the M sequence, the maximum value, the minimum value, and the average value of the periodic cross-correlation result corresponding to the solution of the present disclosure are smaller than those in the sequence sending solution based on the NR protocol and those in the conventional solution. Therefore, interference between different communication apparatuses can be reduced based on the solution of the present disclosure.

Optionally, in the solution of the present disclosure, when the first signal is generated by using the M sequence, because the M sequence has a perfect periodic auto correlation property, that is, the M sequence is the first-type sequence, the M sequence carried by the first signal or a manner of sending the M sequence may be shown in FIG. 11a.

In some other embodiments, the solution of the present disclosure may be applied to an Ipatov sequence. In other words, the N sequences may be Ipatov sequences. 9 Ipatov sequences whose lengths are 127 are used as an example. Based on the solution of the present disclosure, the 9 sequence sending modes may be defined as follows:

a sequence sending mode 1: 1,2,3,4, . . . ,7,8,9;

a sequence sending mode 2: 2,3,4,5, . . . ,8,9,1;

a sequence sending mode 3: 3,4,5,6, . . . ,9,1,2;

a sequence sending mode 7: 7,8,9,1, . . . ,4,5,6;

a sequence sending mode 8: 8,9,1,2, . . . ,5,6,7; and a sequence sending mode 9: 9,1,2,3, . . . ,6,7,8

For the foregoing 9 sequence sending modes, a periodic cross-correlation result between every two sequence sending modes may be calculated, to indicate interference between different communication apparatuses. For the periodic cross-correlation result between two sequence sending modes, refer to the related descriptions of the M sequence.

It is assumed that the foregoing 9 Ipatov sequences whose lengths are 127 are applied to a conventional solution. In this case, for a communication apparatus, the communication apparatus may repeatedly send one of the 9 Ipatov sequences in different periods. In this case, interference between different communication apparatuses is determined based on periodic cross-correlation results of Ipatov sequences sent by the different communication apparatuses. Therefore, for the 9 Ipatov sequences whose lengths are 127, a periodic cross-correlation result between every two Ipatov sequences may be calculated, to indicate interference between different communication apparatuses. For calculation of the periodic cross-correlation result between two sequences, refer to the foregoing related descriptions.

It is assumed that the foregoing 9 Ipatov sequences whose lengths are 127 are applied to a sequence sending solution based on an NR protocol in a sensing scenario. In a case of initializing $C_{init}$=1,2,3, . . . ,9, 9 sequence sending modes may alternatively be obtained in the foregoing calculation manner of f ($n_s$), $n_s$=0,1,2, . . . , 8. For the 9 sequence sending modes in this scenario, a periodic cross-correlation result between every two sequence sending modes may alternatively be calculated, to indicate interference between different communication apparatuses. For example, the following shows three of the 9 sequence sending modes obtained based on the NR protocol, and the other sequence sending modes are not shown.

A sequence sending mode 1 is 1, 7, 0, 4, 2, 7, 3, 7, 0.

A sequence sending mode 2 is 2, 8, 1, 5, 3, 8, 4, 8, 1.

A sequence sending mode 3 is 1, 1, 2, 1, 5, 4, 8, 2, 2.

For example, Table 3 shows a maximum value, a minimum value, and an average value of a periodic cross-correlation result in a case in which the Ipatov sequence whose length is 127 is separately applied to the solution of the present disclosure, the conventional solution, and the sequence sending solution based on the NR protocol.

TABLE 3

| Solution | Maximum value of the periodic cross-correlation result | Minimum value of the periodic cross-correlation result | Average value of the periodic cross-correlation result |
|---|---|---|---|
| Solution of the present disclosure | −21.58 dB | −23.16 dB | −22.47 dB |

TABLE 3-continued

| Solution | Maximum value of the periodic cross-correlation result | Minimum value of the periodic cross-correlation result | Average value of the periodic cross-correlation result |
|---|---|---|---|
| Sequence sending solution based on the NR protocol | −11.26 dB | −22.74 dB | −18.20 dB |
| Conventional solution | −12.04 dB | −18.06 dB | −15.63 dB |

It can be learned from Table 3 that, for the Ipatov sequence, the maximum value, the minimum value, and the average value of the periodic cross-correlation result corresponding to the solution of the present disclosure are smaller than those in the sequence sending solution based on the NR protocol and those in the conventional solution. Therefore, interference between different communication apparatuses can be reduced based on the solution of the present disclosure.

Optionally, the foregoing 9 Ipatov sequences whose lengths are 127 may be any 9 random Ipatov sequences whose lengths are 127. In addition, for any 9 Ipatov sequences whose lengths are 127, the maximum value, the minimum value, and the average value of the periodic cross-correlation result corresponding to the solution of the present disclosure are smaller than those in the sequence sending solution based on the NR protocol and those in the conventional solution.

Optionally, in the solution of the present disclosure, when the first signal is generated by using the Ipatov sequence, because the Ipatov sequence has a perfect periodic auto correlation property, that is, the Ipatov sequence is the first-type sequence, the Ipatov sequence carried by the first signal or a manner of sending the Ipatov sequence may be shown in FIG. 11a.

In still some embodiments, the solution of the present disclosure may be applied to a GCP sequence. In other words, the N sequences may be GCP sequences. 40 GCP sequences whose lengths are 128 are used as an example. Based on the solution of the present disclosure, the 40 sequence sending modes may be defined as follows:

a sequence sending mode 1: 1,2,3,4, . . . ,38,39,40;
a sequence sending mode 2: 2,3,4,5, . . . ,39,40,1;
a sequence sending mode 3: 3,4,5,6, . . . ,9,1,2;
a sequence sending mode 38: 38,39,40,1, . . . ,35,36,37;
a sequence sending mode 39: 39,40,1,2, . . . ,36,37,38; and
a sequence sending mode 40: 40,1,2,3, . . . ,37,38,39

For the foregoing 40 sequence sending modes, a periodic cross-correlation result between every two sequence sending modes may be calculated, to indicate interference between different communication apparatuses. A manner of calculating the periodic cross-correlation result between two sequence sending modes is similar to a manner of calculating a periodic cross-correlation result between sequence sending modes in a case in which sequences are M sequences. A difference lies in that a periodic cross-correlation peak between two GCP sequences is a sum of a periodic cross-correlation peak of two x sequences included in the two GCP sequences and a periodic cross-correlation peak of two y sequences included in the two GCP sequences.

It is assumed that the foregoing 40 GCP sequences whose lengths are 128 are applied to a conventional solution. In this case, for a communication apparatus, the communication apparatus may repeatedly send one of the 40 GCP sequences in different periods. In this case, interference between different communication apparatuses is determined based on periodic cross-correlation results of GCP sequences sent by the different communication apparatuses. Therefore, for the 40 GCP sequences whose lengths are 128, a periodic cross-correlation result between every two GCP sequences may be calculated, to indicate interference between different communication apparatuses. For calculation of the periodic cross-correlation result between two sequences, refer to the foregoing related descriptions.

It is assumed that the foregoing 40 GCP sequences whose lengths are 128 are applied to a sequence sending solution based on an NR protocol in a sensing scenario. In a case of initializing $C_{init}=1,2,3, \ldots, 40$, 40 sequence sending modes may alternatively be obtained in the foregoing calculation manner of $f(n_s)$, $n_s=0,1,2, \ldots, 39$. For the 40 sequence sending modes in this scenario, a periodic cross-correlation result between every two sequence sending modes may alternatively be calculated, to indicate interference between different communication apparatuses. For example, the following shows three of the 40 sequence sending modes obtained based on the NR protocol, and the other sequence sending modes are not shown.

A sequence sending mode 1 is 24, 8, 32, 14, 4, 9, 32, 26, 32, 14, 4, 19, 32, 34, 18, 2, 4, 19, 24, 36, 10, 16, 28, 16, 0, 38, 12, 25, 38, 12, 25, 30, 12, 25, 38, 6, 25, 38, 6, 11.

A sequence sending mode 2 is 25, 9, 33, 15, 5, 10, 33, 27, 33, 15, 5, 20, 33, 35, 19, 3, 5, 20, 25, 37, 11, 17, 29, 17, 1, 39, 13, 26, 39, 13, 26, 31, 13, 26, 39, 7, 26, 39, 7, 12.

A sequence sending mode 3 is 4, 26, 13, 12, 23, 13, 4, 16, 35, 10, 7, 20, 37, 2, 21, 13, 14, 12, 28, 14, 26, 26, 6, 12, 12, 26, 2, 10, 21, 12, 10, 19, 12, 8, 25, 20, 16, 31, 34, 15.

For example, Table 4 shows a maximum value, a minimum value, and an average value of a periodic cross-correlation result in a case in which the GCP sequence whose length is 128 is separately applied to the solution of the present disclosure, the conventional solution, and the sequence sending solution based on the NR protocol.

TABLE 4

| Solution | Maximum value of the periodic cross-correlation result | Minimum value of the periodic cross-correlation result | Average value of the periodic cross-correlation result |
|---|---|---|---|
| Solution of the present disclosure | −22.50 dB | −35.70 dB | −29.41 dB |
| Sequence sending solution based on the NR protocol | −17.64 dB | −34.12 dB | −28.08 dB |
| Conventional solution | −12.04 dB | −19.22 dB | −13.94 dB |

It can be learned from Table 4 that, for the GCP sequence, the maximum value, the minimum value, and the average value of the periodic cross-correlation result corresponding to the solution of the present disclosure are smaller than those in the sequence sending solution based on the NR protocol and those in the conventional solution. Therefore, interference between different communication apparatuses can be reduced based on the solution of the present disclosure.

Optionally, the foregoing 40 GCP sequences whose lengths are 128 may be any 40 random GCP sequences whose lengths are 128. In addition, for any 40 GCP sequences whose lengths are 128, the maximum value, the minimum value, and the average value of the periodic cross-correlation result corresponding to the solution of the present disclosure are smaller than those in the sequence sending solution based on the NR protocol and those in the conventional solution.

Optionally, in the solution of the present disclosure, when the first signal is generated by using the GCP sequence, because the GCP sequence has a perfect aperiodic auto correlation property, that is, the GCP sequence is the second-type sequence, there may be a sending interval for repeatedly sending a GCP sequence by the first communication apparatus.

Figure 13A:
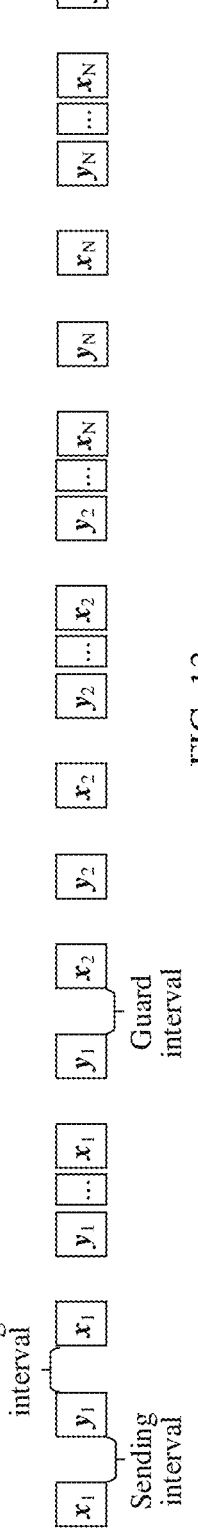
FIG. 13a is an example diagram of repeatedly sending a GCP sequence according to an embodiment of the present disclosure.

In a possible implementation, when a GCP sequence is repeatedly sent, as shown in FIG. 13*a*, repetition may be performed in a manner of an x sequence, a y sequence, an x sequence, a y sequence, . . . , an x sequence, a y sequence, an x sequence, and a y sequence. In addition, there may also be a sending interval between an x sequence and a y sequence. A sending interval between two GCP sequences may be used as a guard interval.

Figure 13B:
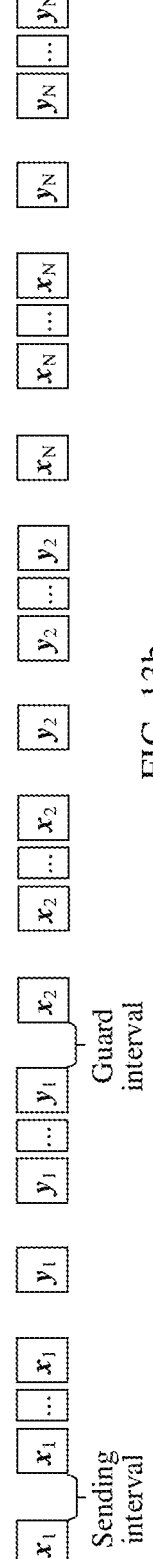
FIG. 13b is an example diagram of repeatedly sending another GCP sequence according to an embodiment of the present disclosure.

In another possible implementation, when a GCP sequence is repeatedly sent, as shown in FIG. 13*b*, repetition may be performed in a manner of an x sequence, an x sequence, . . . , an x sequence, a y sequence, a y sequence, . . . , and a y sequence. In addition, there may alternatively be a sending interval between an x sequence and an x sequence, between a y sequence and a y sequence, and between an x sequence and a y sequence.

Certainly, the GCP sequence may alternatively be repeatedly sent in another manner. For example, repetition is performed in a manner of an x sequence, an x sequence, a y sequence, a y sequence, . . . , an x sequence, an x sequence, a y sequence, and a y sequence. This is not specifically limited in the present disclosure.

In still some embodiments, the solution of the present disclosure may be applied to a Gold sequence. In other words, the N sequences may be Gold sequences. 40 Gold sequences whose lengths are 127 are used as an example. Based on the solution of the present disclosure, the 40 sequence sending modes may be defined as follows:

a sequence sending mode 1: 1,2,3,4, . . . ,38,39,40;
a sequence sending mode 2: 2,3,4,5, . . . ,39,40,1;
a sequence sending mode 3: 3,4,5,6, . . . ,9,1,2;
a sequence sending mode 38: 38,39,40,1, . . . ,35,36,37;
a sequence sending mode 39: 39,40,1,2, . . . ,36,37,38; and
a sequence sending mode 40: 40,1,2,3, . . . ,37,38,39

For the foregoing 40 sequence sending modes, a periodic cross-correlation result between every two sequence sending modes may be calculated, to indicate interference between different communication apparatuses. For the periodic cross-correlation result between two sequence sending modes, refer to the related descriptions of the M sequence.

In addition, for the foregoing 40 sequence sending modes, a periodic auto correlation result corresponding to each sequence sending mode may be calculated. For example, a periodic auto correlation result corresponding to the sequence sending mode 1 is a sum of a periodic auto correlation result of an $n^{th}$ Gold sequence indicated by the sequence sending mode 1, where n=0,1, . . . 39. In other words, the periodic auto correlation result corresponding to the sequence sending mode 1 is an accumulated value of the following 40 periodic auto correlation results: a periodic auto correlation result of a Gold sequence 1, a periodic auto correlation result of a Gold sequence 2, . . . , a periodic auto correlation result of a Gold sequence 39, and a periodic auto correlation result of a Gold sequence 40.

Optionally, the periodic auto correlation result may be a relative value in a unit of dB. For example, a periodic auto correlation result of a sequence may be equal to:

$$20 \times \log_{10} \left( \frac{\text{maximum periodic auto correlation side lobe}}{\text{periodic auto correlation peak}} \right)$$

For example, the periodic auto correlation result of the Gold sequence 1 is equal to:

$$20 \times \log_{10} \left( \frac{\text{maximum periodic autocorrelation side lobe of the Gold sequence 1}}{\text{periodic auto correlation peak of the Gold sequence}} \right)$$

It should be noted that for Gold sequences whose lengths are the same, different Gold sequences have a same periodic auto correlation peak. For example, in the 40 Gold sequences whose lengths are 127, periodic auto correlation peaks of the Gold sequences are the same.

It is assumed that the foregoing 40 Gold sequences whose lengths are 127 are applied to a conventional solution. In this case, for a communication apparatus, the communication apparatus may repeatedly send one of the 40 Gold sequences in different periods. In this case, interference between different communication apparatuses is determined based on periodic cross-correlation results of Gold sequences sent by the different communication apparatuses. Therefore, for the 40 Gold sequences whose lengths are 127, a periodic cross-correlation result between every two Gold sequences may be calculated, to indicate interference between different communication apparatuses. For calculation of the periodic cross-correlation result between two sequences, refer to the foregoing related descriptions. In addition, an auto correlation result of each Gold sequence may be further calculated. For a calculation manner, refer to the foregoing related descriptions.

It is assumed that the foregoing 40 Gold sequences whose lengths are 127 are applied to a sequence sending solution based on an NR protocol in a sensing scenario. In a case of initializing $C_{init}$=1,2,3, . . . ,40, 9 sequence sending modes may alternatively be obtained in the foregoing calculation manner of f (n), n=0,1,2, . . . , 39. For example, the following shows three of the 40 sequence sending modes obtained based on the NR protocol, and the other sequence sending modes are not shown.

A sequence sending mode 1 is 24, 8, 32, 14, 4, 9, 32, 26, 32, 14, 4, 19, 32, 34, 18, 2, 4, 19, 24, 36, 10, 16, 28, 16, 0, 38, 12, 25, 38, 12, 25, 30, 12, 25, 38, 6, 25, 38, 6, 11.

A sequence sending mode 2 is 25, 9, 33, 15, 5, 10, 33, 27, 33, 15, 5, 20, 33, 35, 19, 3, 5, 20, 25, 37, 11, 17, 29, 17, 1, 39, 13, 26, 39, 13, 26, 31, 13, 26, 39, 7, 26, 39, 7, 12.

A sequence sending mode 3 is 4, 26, 13, 12, 23, 13, 4, 16, 35, 10, 7, 20, 37, 2, 21, 13, 14, 12, 28, 14, 26, 26, 6, 12, 12, 26, 2, 10, 21, 12, 10, 19, 12, 8, 25, 20, 16, 31, 34, 15.

For the 40 sequence sending modes in this scenario, a periodic cross-correlation result between every two sequence sending modes may alternatively be calculated, to indicate interference between different communication apparatuses. In addition, a periodic auto correlation result corresponding to each sequence sending mode may be further calculated. For details, refer to related descriptions in the foregoing solution of the present disclosure.

For example, Table 5 shows a maximum value, a minimum value, and an average value of a periodic cross-correlation result in a case in which the Gold sequence whose length is 127 is separately applied to the solution of the present disclosure, the conventional solution, and the sequence sending solution based on the NR protocol.

TABLE 5

| Solution | Maximum value of the periodic cross-correlation result | Minimum value of the periodic cross-correlation result | Average value of the periodic cross-correlation result |
|---|---|---|---|
| Solution of the present disclosure | −28.10 dB | −32.53 dB | −30.30 dB |
| Sequence sending solution based on the NR protocol | −20.64 dB | −31.45 dB | −27.88 dB |
| Conventional solution | −17.47 dB | −17.47 dB | −17.47 dB |

It can be learned from Table 5 that, for the Gold sequence, the maximum value, the minimum value, and the average value of the periodic cross-correlation result corresponding to the solution of the present disclosure are smaller than those in the sequence sending solution based on the NR protocol and those in the conventional solution. Therefore, interference between different communication apparatuses can be reduced based on the solution of the present disclosure.

For example, Table 6 shows a maximum value, a minimum value, and an average value of a periodic auto correlation result in a case in which the Gold sequence whose length is 127 is separately applied to the solution of the present disclosure, the conventional solution, and the sequence sending solution based on the NR protocol.

TABLE 6

| Solution | Maximum value of the periodic auto correlation result | Minimum value of the periodic auto correlation result | Average value of the periodic auto correlation result |
|---|---|---|---|
| Solution of the present disclosure | −32.53 dB | −32.53 dB | −32.53 dB |
| Sequence sending solution based on the NR protocol | −20.64 dB | −31.44 dB | −27.59 dB |
| Conventional solution | −17.47 dB | −17.47 dB | −17.47 dB |

It can be learned from Table 6 that, for the Gold sequence, the maximum value, the minimum value, and the average value of the periodic auto correlation result corresponding to the solution of the present disclosure are smaller than those in the sequence sending solution based on the NR protocol and those in the conventional solution. Therefore, a ratio of an auto correlation side lobe to an auto correlation peak can be reduced based on the solution of the present disclosure. In this way, sensing accuracy is improved.

Optionally, the foregoing 40 Gold sequences whose lengths are 127 may be any 40 random Gold sequences whose lengths are 127. In addition, for any 40 Gold sequences whose lengths are 127, the maximum value, the minimum value, and the average value of the periodic cross-correlation result and the maximum value, the minimum value, and the average value of the periodic auto correlation result corresponding to the solution of the present disclosure are smaller than those in the sequence sending solution based on the NR protocol and those in the conventional solution.

Optionally, in the solution of the present disclosure, when the first signal is generated by using the Gold sequence, the Gold sequence carried in the first signal, or a manner of sending the Gold sequence may be shown in FIG. 11a.

It may be understood that, in the foregoing embodiments, methods and/or steps implemented by the first communication apparatus may alternatively be implemented by a part (for example, a processor, a chip, a chip system, a circuit, a logic module, or software like a chip or a circuit) that may be used in the first communication apparatus.

The foregoing mainly describes the solution provided in the present disclosure. Correspondingly, the present disclosure further provides a communication apparatus, and the communication apparatus is configured to implement various methods in the foregoing. The communication apparatus may be the first communication apparatus in the foregoing method embodiments, or an apparatus including the foregoing first communication apparatus, or a part that can be used in the first communication apparatus.

It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, the present disclosure may be implemented by hardware or a combination of hardware and computer software. Whether a function is performed by the hardware or the hardware driven by the computer software depends on particular applications and design constraints of the technical solutions. A person skilled in the art may use different methods to implement the described functions for each particular application, but it should not be considered that this implementation goes beyond the scope of the present disclosure.

In embodiments of the present disclosure, the communication apparatus may be divided into function modules based on the foregoing method embodiments. For example, each function module may be obtained through division based on each corresponding function, or two or more functions may be integrated into one processing module. The foregoing integrated module may be implemented in a form of hardware, or may be implemented in a form of a software function module. It should be noted that division into the modules in embodiments of the present disclosure is an example, is merely division into logical functions, and may be another division during actual implementation.

Figure 14:
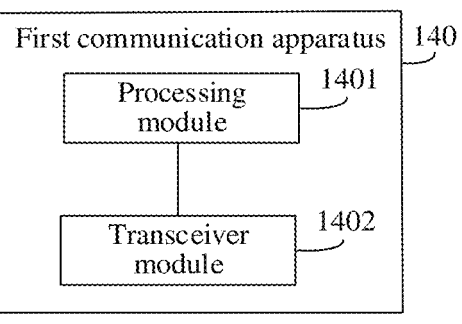
FIG. 14 is a diagram of a structure of an example first communication apparatus according to an embodiment of the present disclosure.

FIG. 14 is a diagram of a structure of a communication apparatus 140. The communication apparatus 140 includes a processing module 1401 and a transceiver module 1402.

In some embodiments, the communication apparatus 140 may further include a storage module (which is not shown in FIG. 14), configured to store program instructions and data.

In some embodiments, the transceiver module 1402 may also be referred to as a transceiver unit, configured to implement a sending function and/or a receiving function. The transceiver module 1402 may include a transceiver circuit, a transceiver machine, a transceiver, or a communication interface.

In some embodiments, the transceiver module 1402 may include a receiving module and a sending module, respectively configured to perform receiving and sending steps performed by the first communication apparatus in the foregoing method embodiments, and/or configured to support another process of the technology described in this specification. The processing module 1401 may be configured to perform processing (for example, determining, obtaining, generation, or the like) steps performed by the first communication apparatus in the foregoing method embodiments, and/or configured to support another process of the technology described in this specification.

The processing module 1401 is configured to determine N sequence sending modes. The sequence sending modes indicate sending orders of N sequences, the N sequences are sent by the first communication apparatus in N periods, N is a positive integer greater than 1, and a cyclic shift value between sending orders indicated by any two adjacent sequence sending modes is 1.

The transceiver module 1402 is configured to send a first signal based on a first sequence sending mode. The first sequence sending mode is determined based on K second sequence sending modes and the N sequence sending modes, the second sequence sending mode is a sequence sending mode corresponding to a second communication apparatus, the N sequence sending modes include the first sequence sending mode and the K second sequence sending modes, and K is a positive integer.

Optionally, when K is equal to 1, a cyclic shift value between the first sequence sending mode and the one second sequence sending mode is the largest.

Optionally, when K is greater than 1, a sum of cyclic shift values between the first sequence sending mode and all second sequence sending modes is the largest.

Optionally, when K is greater than 1, a cyclic shift value between the first sequence sending mode and a target second sequence sending mode is the largest, where the target second sequence sending mode is a sequence sending mode whose corresponding interference power is strongest in the K second sequence sending modes.

Optionally, the first signal includes sub-signals in the N periods, a sub-signal in an $n^{th}$ period is generated by using an $n^{th}$ sequence indicated by the first sequence sending mode, and n=0.1 . . . . N−1.

Optionally, the N sequences are first-type sequences, the $n^{th}$ sequence includes P repeated first-type sequences, and P is a positive integer greater than 1.

Optionally, the N sequences are second-type sequences, the $n^{th}$ sequence includes P repeated second-type sequences, a sending interval between the P repeated second-type sequences is greater than or equal to a duration occupied for sending the second-type sequence, and P is a positive integer greater than 1.

Optionally, the transceiver module 1402 is further configured to receive a first sequence sent by the second communication apparatus. The first sequence is one of the N sequences. The processing module 1401 is further configured to determine a second sequence sending mode based on the first sequence. A $1^{st}$ sequence indicated by the second sequence sending mode is the first sequence.

Optionally, that the transceiver module 1402 is further configured to receive a first sequence sent by the second communication apparatus includes: the transceiver module 1402 is configured to monitor, based on a first period, a sequence sent by the second communication apparatus. The first period is an interval between two adjacent times of monitoring. The first sequence is a sequence detected in the first period. The first period is greater than or equal to a sending duration of the first signal.

Optionally, that the second sequence sending mode is a sequence sending mode corresponding to a second communication apparatus includes: the second sequence sending mode is a sequence sending mode used by the second communication apparatus; or the second sequence sending mode is a sequence sending mode obtained by performing cyclic shift on a sequence sending mode used by the second communication apparatus.

Optionally, the transceiver module 1402 is further configured to receive an echo signal of the first signal. The processing module 1401 is further configured to perform an auto correlation operation based on the echo signal and the first signal. The processing module 1401 is further configured to determine a distance between the first communication apparatus and a target object based on an auto correlation operation result.

Optionally, the first communication apparatus is a radar, or the first communication apparatus is a terminal device or a network device having a radar function.

Optionally, the first signal is a signal used for radar ranging.

Optionally, the N sequences include one of an M sequence, a Gold sequence, a golay complementary pair GCP sequence, or an Ipatov sequence.

All related content of the steps in the foregoing method embodiments may be cited in function descriptions of the corresponding function modules.

In example embodiments of the present disclosure, the communication apparatus 140 is presented in a form of function modules obtained through division in an integrated manner. The "module" herein may be an application-specific integrated circuit (ASIC), a circuit, a processor and a memory that execute one or more software or firmware programs, an integrated logic circuit, and/or another component that can provide the foregoing functions.

In a possible product form, a person skilled in the art may figure out that the communication apparatus 140 may use a form of the communication apparatus 700 shown in FIG. 7a.

In an example, a function/implementation process of the processing module 1401 in FIG. 14 may be implemented by using the processor 701 in the communication apparatus 700 shown in FIG. 7a by invoking computer-executable instructions stored in the memory 703, and a function/implementation process of the transceiver module 1402 in FIG. 14 may be implemented by using the communication interface 704 in the communication apparatus 700 shown in FIG. 7a.

In another possible product form, the communication apparatus in this embodiment may alternatively be implemented by using the following: one or more field programmable gate arrays (FPGA), a programmable logic device (PLD), a controller, a state machine, gate logic, and a discrete hardware part, any other proper circuit, or any combination of circuits that can perform various functions described throughout the present disclosure.

In some embodiments, when the communication apparatus 140 in FIG. 14 is a chip or a chip system, a function/implementation process of the transceiver module 1402 may be implemented by using an input/output interface (or a communication interface) of the chip or the chip system, and a function/implementation process of the processing module 1401 may be implemented by using a processor (or a processing circuit) of the chip or the chip system.

Because the communication apparatus 140 provided in this embodiment may perform the foregoing methods, for technical effects that can be achieved by the communication apparatus 140, refer to the foregoing method embodiments.

In some embodiments, an embodiment of the present disclosure further provides a communication apparatus. The communication apparatus includes a processor. The processor is configured to implement the method in any one of the foregoing method embodiments.

In a possible implementation, the communication apparatus further includes a memory. The memory is configured to store necessary program instructions and data. The processor may invoke program code stored in the memory, to indicate the communication apparatus to perform the method in any one of the foregoing method embodiments. Certainly, the communication apparatus may not include a memory.

In another possible implementation, the communication apparatus further includes an interface circuit. The interface circuit is a code/data read/write interface circuit, and the interface circuit is configured to receive computer-executable instructions (where the computer-executable instructions are stored in the memory, and may be directly read from the memory, or may be read via another component) and transmit the computer-executable instructions to the processor.

In still another possible implementation, the communication apparatus further includes a communication interface, and the communication interface is configured to communicate with a module other than the communication apparatus.

It may be understood that the communication apparatus may be a chip or a chip system. When the communication apparatus is a chip system, the communication apparatus may include a chip, or may include a chip and another discrete component. This is not specifically limited in this embodiment.

The present disclosure further provides a computer-readable storage medium. The computer-readable storage medium stores a computer program or instructions. When the computer program is executed or the instructions are executed by a computer, functions in any one of the foregoing method embodiments are implemented.

The present disclosure further provides a computer program product. When the computer program product is executed by a computer, functions in any one of the foregoing method embodiments are implemented.

A person of ordinary skill in the art may understand that, for the purpose of convenient and brief description, for detailed working processes of the foregoing system, apparatuses, and units, refer to corresponding processes in the foregoing method embodiments.

It may be understood that the system, apparatuses, and methods described in the present disclosure may alternatively be implemented in another manner. For example, the described apparatus embodiments are merely examples. For example, division into the units is merely logical function division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be physically separated or not, in other words, may be located together in the same place or distributed on a plurality of network units. Parts displayed as units may be or may be not physical units.

Some or all of the units may be selected based on actual requirements to achieve the objectives of the solution of embodiments.

In addition, function units in embodiments of the present disclosure may be integrated into one processing unit, each of the units may exist alone physically, or two or more units may be integrated into one unit.

The foregoing embodiments may be implemented completely or partially by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions in embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, like a server or a data center integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In embodiments of the present disclosure, the computer may include the foregoing apparatuses.

Although the present disclosure is described with reference to embodiments, in a process of implementing the present disclosure that claims protection, a person skilled in the art may understand and implement another variation of the disclosed embodiments by viewing the accompanying drawings, disclosed content, and appended claims. In the claims, the word "comprising" does not exclude another component or step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although the present disclosure is described with reference to specific features and embodiments thereof, it is clear that various modifications and combinations may be made to the present disclosure without departing from the spirit and scope of the present disclosure. Correspondingly, the specification and accompanying drawings are merely example descriptions of the present disclosure defined by the accompanying claims, and are considered as any of or all modifications, variations, combinations or equivalents that cover the scope of the present disclosure. It is clearly that a person skilled in the art can make various modifications and variations to the present disclosure without departing from the spirit and scope of the present disclosure. In this way, the present disclosure is intended to cover these modifications and variations provided that the modifications and variations of the present disclosure fall within the scope of the claims of the present disclosure and their equivalent technologies.

What is claimed is:

1. A signal sending method, wherein the method is applied to a first communication apparatus, and the method comprises:

determining N sequence sending modes, wherein the N sequence sending modes indicate sending orders of N sequences, the N sequences are sent by the first communication apparatus in N periods, N is a positive integer greater than 1, and a cyclic shift value between sending orders indicated by any two adjacent sequence sending modes is 1; and sending a first signal based on a first sequence sending mode, wherein the first sequence sending mode is determined based on K second sequence sending modes and the N sequence sending modes, each of the K second sequence sending modes corresponds to a second communication apparatus, the N sequence sending modes comprise the first sequence sending mode and the K second sequence sending modes, and K is a positive integer.

2. The method according to claim 1, wherein, when K is equal to 1, a cyclic shift value between the first sequence sending mode and the one second sequence sending mode is the largest.

3. The method according to claim 1, wherein, when K is greater than 1, a sum of cyclic shift values between the first sequence sending mode and all K second sequence sending modes is the largest.

4. The method according to claim 1, wherein, when K is greater than 1, a cyclic shift value between the first sequence sending mode and a target second sequence sending mode is the largest, wherein the target second sequence sending mode is a sequence sending mode with strongest corresponding interference power in the K second sequence sending modes.

5. The method according to claim 1, wherein the first signal comprises sub-signals in the N periods, a sub-signal in an $n^{th}$ period is generated by using an $n^{th}$ sequence indicated by the first sequence sending mode, and n= 0,1, ... N−1.

6. The method according to claim 5, wherein the N sequences are first-type sequences, the $n^{th}$ sequence comprises P repeated first-type sequences, and P is a positive integer greater than 1.

7. The method according to claim 5, wherein the N sequences are second-type sequences, the $n^{th}$ sequence comprises P repeated second-type sequences, a sending interval between the P repeated second-type sequences is greater than or equal to a duration occupied for sending the second-type sequence, and P is a positive integer greater than 1.

8. The method according to claim 1, wherein before the sending a first signal based on a first sequence sending mode, the method further comprises:

receiving a first sequence sent by the second communication apparatus, wherein the first sequence is one of the N sequences; and determining the K second sequence sending modes based on the first sequence, wherein a $1^{st}$ sequence indicated by the K second sequence sending modes is the first sequence.

9. The method according to claim 8, wherein the receiving a first sequence sent by the second communication apparatus comprises:

monitoring, based on a first period, a sequence sent by the second communication apparatus, wherein the first sequence is detected in the first period, the first period is an interval between two adjacent times of monitoring, and the first period is greater than or equal to a sending duration of the first signal.

10. The method according to claim 1, wherein that each of the K second sequence sending modes corresponds to a second communication apparatus comprises:

the respective second sequence sending mode is used by the second communication apparatus; or the respective second sequence sending mode is obtained by performing cyclic shift on a sequence sending mode used by the second communication apparatus.

11. The method according to claim 1, further comprising:

receiving an echo signal of the first signal;

performing an auto correlation operation based on the echo signal and the first signal; and determining a distance between the first communication apparatus and a target object based on an auto correlation operation result.

12. The method according to claim 1, wherein the first communication apparatus is a radar, or the first communication apparatus is a terminal device or a network device having a radar function.

13. The method according to claim 1, wherein the first signal is a signal used for radar ranging.

14. The method according to claim 1, wherein the N sequences comprise one of an M sequence, a Gold sequence, a golay complementary pair GCP sequence, or an Ipatov sequence.

15. An apparatus, comprising:

a memory storing instructions; and at least one processor in communication with the memory, the at least one processor configured, upon execution of the instructions, to perform operations comprising:

determining N sequence sending modes, wherein the N sequence sending modes indicate sending orders of N sequences, the N sequences are sent by the apparatus in N periods, N is a positive integer greater than 1, and a cyclic shift value between sending orders indicated by any two adjacent sequence sending modes is 1; and sending a first signal based on a first sequence sending mode, wherein the first sequence sending mode is determined based on K second sequence sending modes and the N sequence sending modes, the K second sequence sending modes correspond to a second communication apparatus, the N sequence sending modes comprise the first sequence sending mode and the K second sequence sending modes, and K is a positive integer.

16. The apparatus according to claim 15, wherein when K is equal to 1, a cyclic shift value between the first sequence sending mode and the one second sequence sending mode is the largest.

17. The apparatus according to claim 15, wherein when K is greater than 1, a sum of cyclic shift values between the first sequence sending mode and all K second sequence sending modes is the largest.

18. The apparatus according to claim 15, wherein when K is greater than 1, a cyclic shift value between the first sequence sending mode and a target second sequence sending mode is the largest, wherein the target second sequence sending mode is a sequence sending mode with largest corresponding interference power in the K second sequence sending modes.

19. The apparatus according to claim 15, wherein the first signal comprises sub-signals in the N periods, a sub-signal in an $n^{th}$ period is generated by using an $n^{th}$ sequence indicated by the first sequence sending mode, and n= 0,1, ... N−1.

20. A non-transitory computer-readable storage medium, storing computer instructions that, when executed by at least one processor, control the at least one processor to perform operations comprising:

determining N sequence sending modes, wherein the N sequence sending modes indicate sending orders of N sequences, the N sequences are sent by a communication apparatus in N periods, N is a positive integer greater than 1, and a cyclic shift value between sending orders indicated by any two adjacent sequence sending modes is 1; and sending a first signal based on a first sequence sending mode, wherein the first sequence sending mode is determined based on K second sequence sending modes and the N sequence sending modes, the K second sequence sending modes correspond to a second communication apparatus, the N sequence sending modes comprise the first sequence sending mode and the K second sequence sending modes, and K is a positive integer.

* * * * *